US012473798B2

(12) United States Patent
Werries et al.

(10) Patent No.: US 12,473,798 B2
(45) Date of Patent: Nov. 18, 2025

(54) VALVE ASSEMBLIES FOR HIGH-TEMPERATURE WELLS

(71) Applicants: NCS MULTISTAGE INC., Calgary (CA); NCS MULTISTAGE, LLC, Houston, TX (US)

(72) Inventors: Michael Werries, Calgary (CA); Jesse Parker Powell, Houston, TX (US); James Gambrell King, Houston, TX (US)

(73) Assignees: NCS Multistage Inc., Calgary (CA); NCS Multistage, LLC, Houston, TX (US)

(*) Notice: Subject to any disclaimer, the term of this patent is extended or adjusted under 35 U.S.C. 154(b) by 0 days.

(21) Appl. No.: 18/722,797

(22) PCT Filed: Nov. 17, 2022

(86) PCT No.: PCT/CA2022/051701
§ 371 (c)(1),
(2) Date: Jun. 21, 2024

(87) PCT Pub. No.: WO2023/122826
PCT Pub. Date: Jul. 6, 2023

(65) Prior Publication Data
US 2025/0067145 A1    Feb. 27, 2025

Related U.S. Application Data

(60) Provisional application No. 63/266,244, filed on Dec. 30, 2021.

(30) Foreign Application Priority Data

May 20, 2022   (WO) ................ PCT/CA2022/050809

(51) Int. Cl.
E21B 34/14    (2006.01)
F16K 3/24    (2006.01)
(Continued)

(52) U.S. Cl.
CPC .............. E21B 34/14 (2013.01); F16K 3/243 (2013.01); F16K 3/265 (2013.01); F16K 47/08 (2013.01); F24T 10/20 (2018.05); E21B 2200/06 (2020.05)

(58) Field of Classification Search
CPC ...... E21B 34/14; E21B 2200/06; F16K 3/243; F16K 3/265; F16K 47/08; F24T 10/20
See application file for complete search history.

(56) References Cited

U.S. PATENT DOCUMENTS 5,782,303 A    7/1998   Christian
8,267,178 B1   9/2012   Sommers et al.
(Continued)

FOREIGN PATENT DOCUMENTS

CA       3100997      5/2022
CN       102383760 A  3/2012
(Continued)

OTHER PUBLICATIONS

International Search Report (ISR) of the International Searching Authority mailed Jan. 20, 2023 in parent international application PCT/CA2022/051701.

Primary Examiner — John Bastianelli
(74) Attorney, Agent, or Firm — Polson Intellectual Property Law, PC; Margaret Polson

(57) ABSTRACT

A valve assembly suitable for use in a high temperature well, such as a geothermal well. The valve assembly comprises a tubular housing having ports to allow fluid communication between a fluid passageway in the valve assembly and the outside of the valve assembly, an outer sleeve longitudinally (Continued)

slidable in the tubular housing, and an inner sleeve longitudinally slidable in the outer sleeve. The outer and inner sleeves are slidable to various positions to prevent, allow or restrict flow through the ports. The valve assembly may include sealing assemblies that can withstand high temperatures, frangible plugs in the ports that can be sheared to open the ports, and/or a coupling member for coupling the inner and outer sleeve while the ports are being opened. The valve assembly may have ports configured in a manner that allows for sequential opening of the ports.

20 Claims, 18 Drawing Sheets

(51) Int. Cl.
*F16K 3/26* (2006.01)
*F16K 47/08* (2006.01)
*F24T 10/20* (2018.01)

(56) References Cited

U.S. PATENT DOCUMENTS

| | | | | |
|---|---|---|---|---|
| 8,469,105 | B2* | 6/2013 | O'Malley | E21B 43/12 |
| | | | | 166/330 |
| 9,121,252 | B2* | 9/2015 | George | E21B 34/108 |
| 9,650,866 | B2* | 5/2017 | George | E21B 23/042 |
| 2008/0041588 | A1* | 2/2008 | Richards | E21B 34/08 |
| | | | | 166/205 |
| 2013/0206245 | A1 | 8/2013 | Clark et al. | |
| 2013/0319664 | A1 | 12/2013 | McNamee et al. | |

FOREIGN PATENT DOCUMENTS

| | | | |
|---|---|---|---|
| EP | 2963232 | A1 | 1/2016 |
| WO | 2020/181359 | A1 | 9/2020 |
| WO | 2022/241567 | A1 | 11/2022 |
| WO | 2022/241569 | A1 | 11/2022 |

* cited by examiner

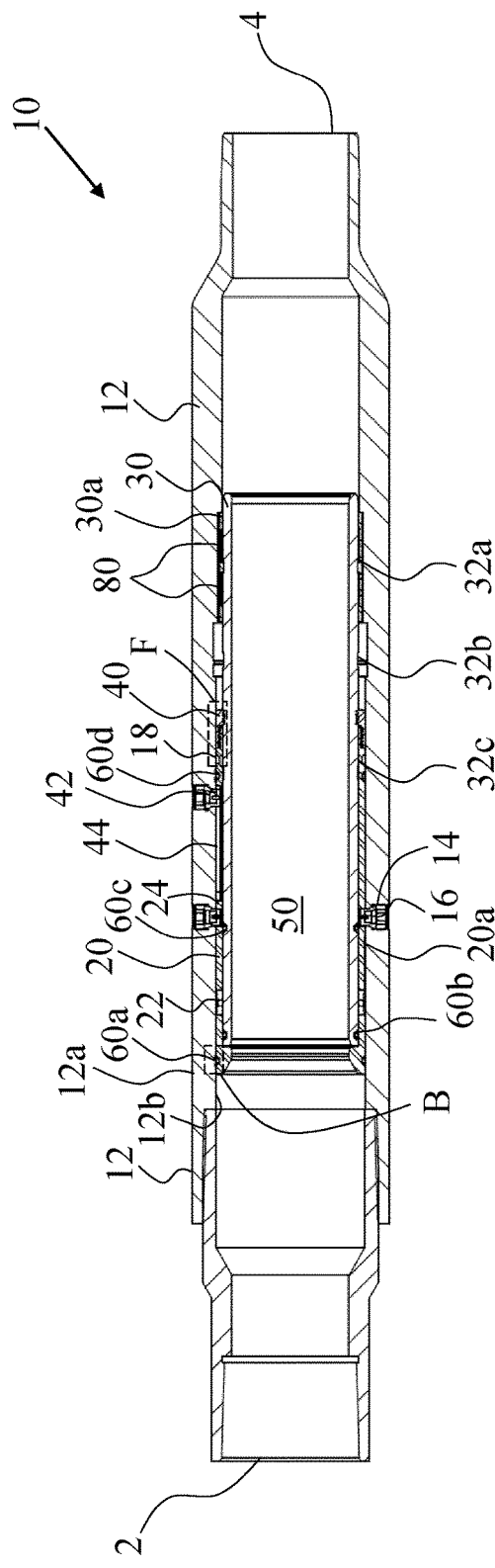
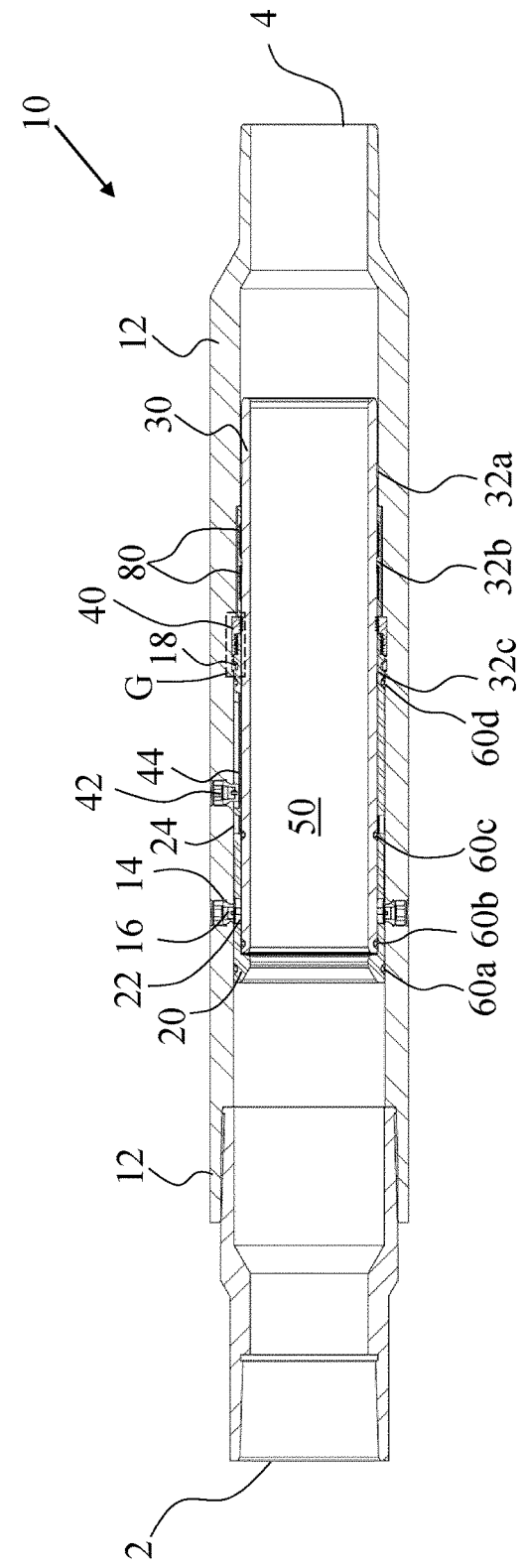
FIG. 1A
FIG. 1B

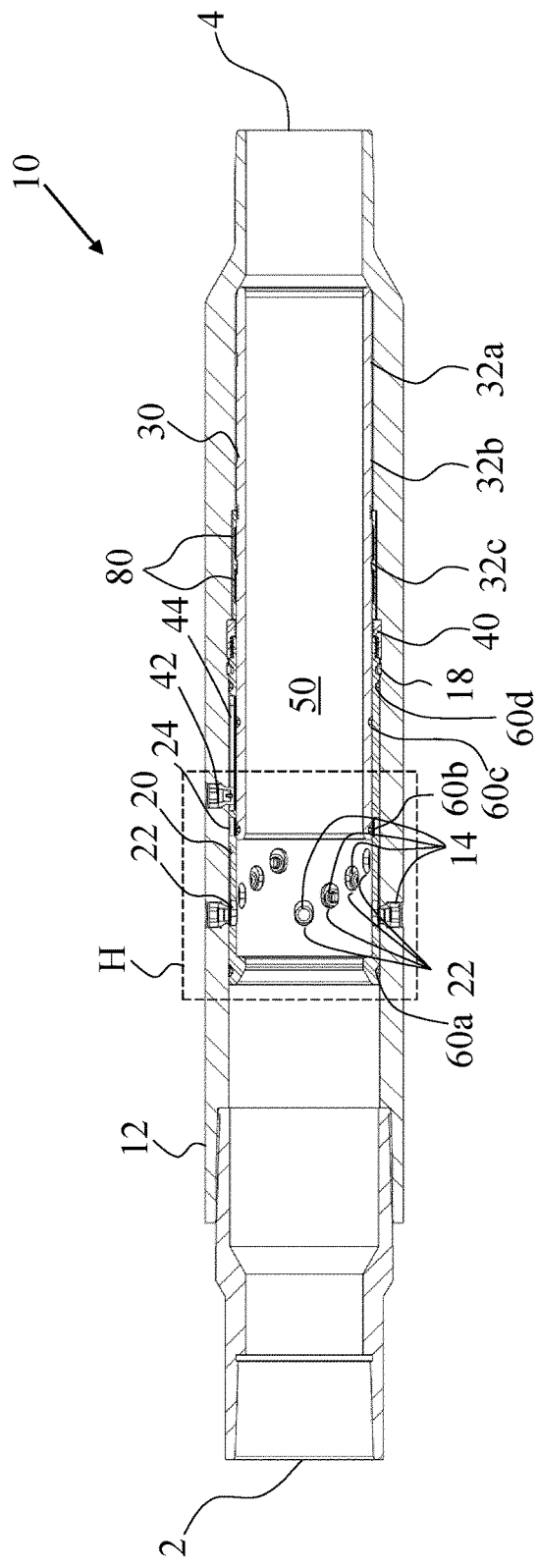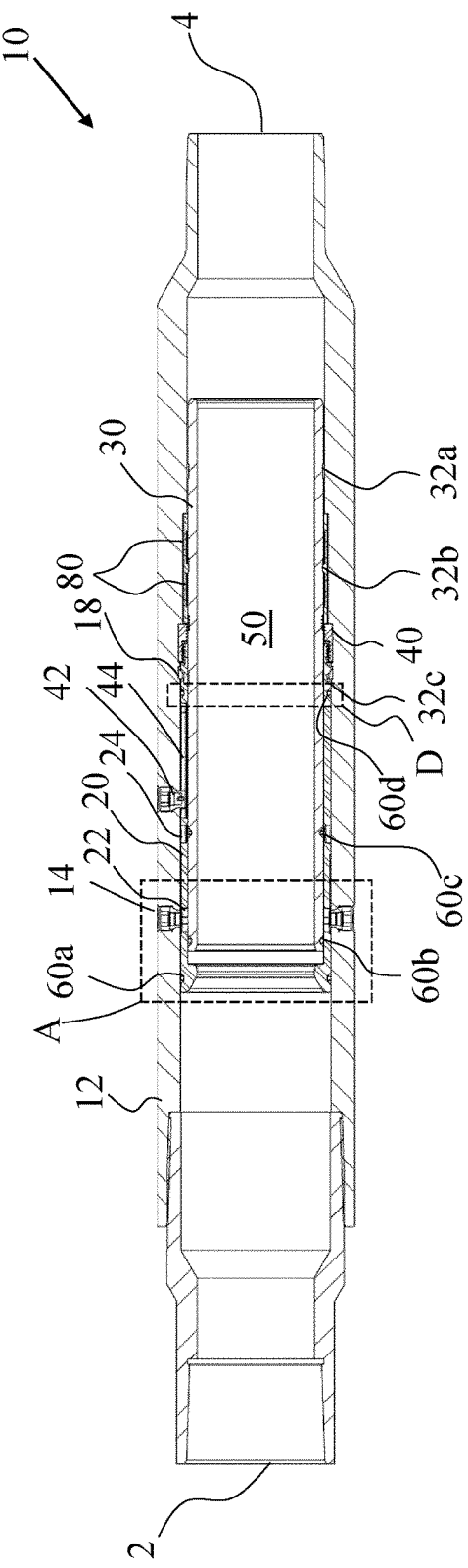
FIG. 1C
FIG. 1D

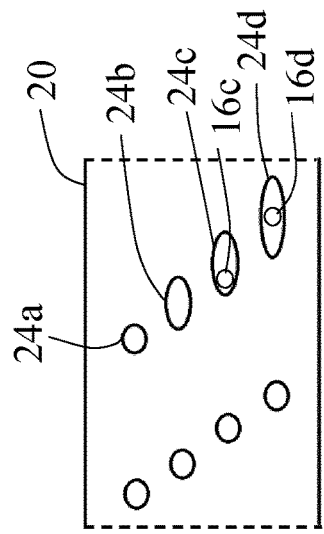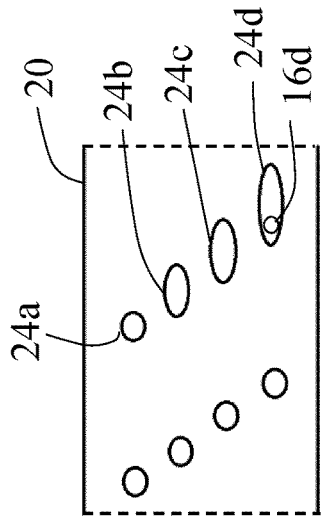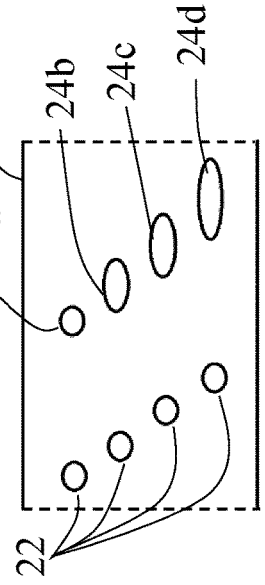
FIG. 5C
FIG. 5D
FIG. 5E
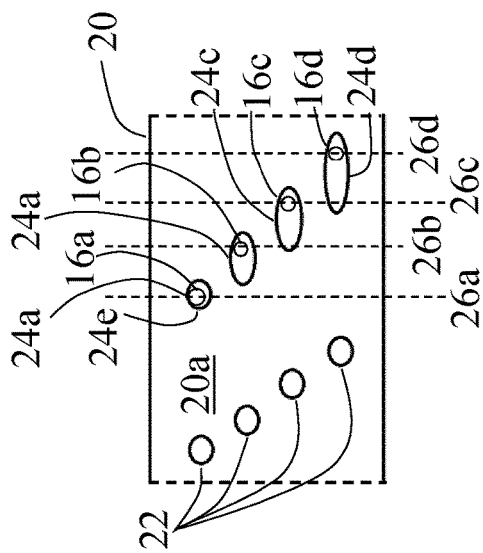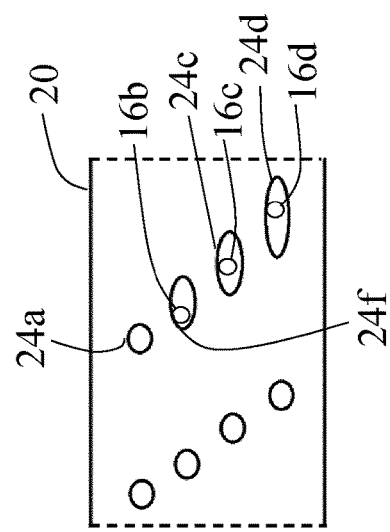
FIG. 5A
FIG. 5B

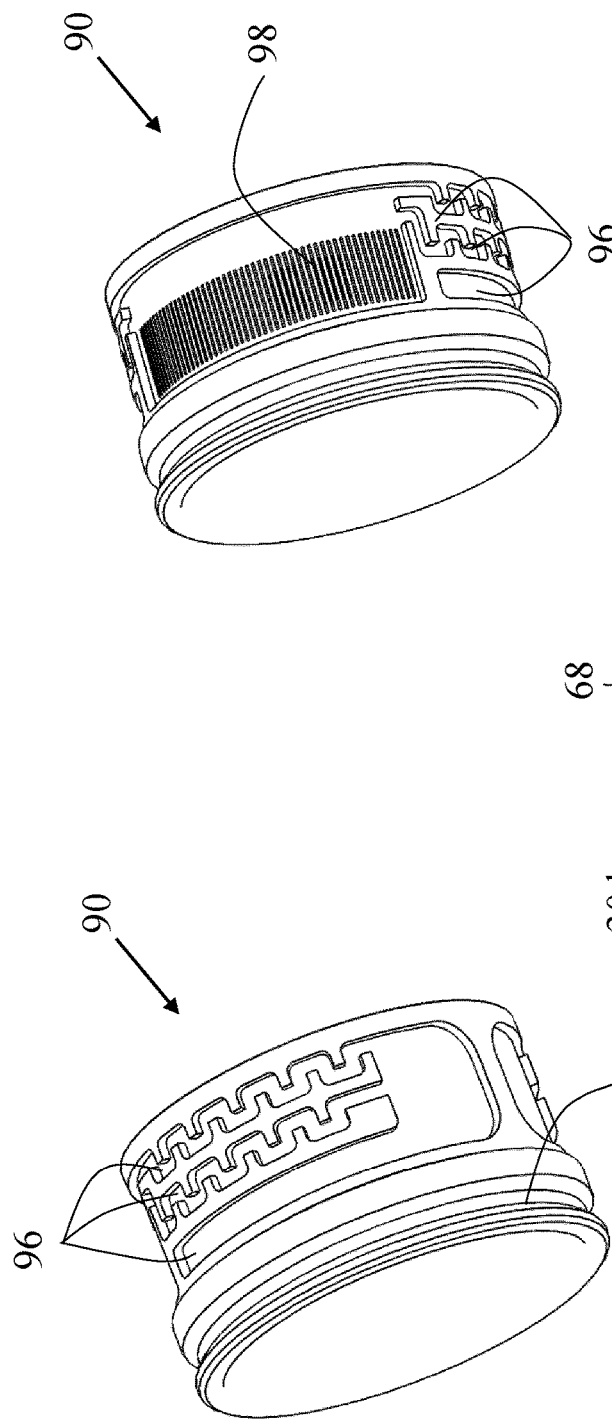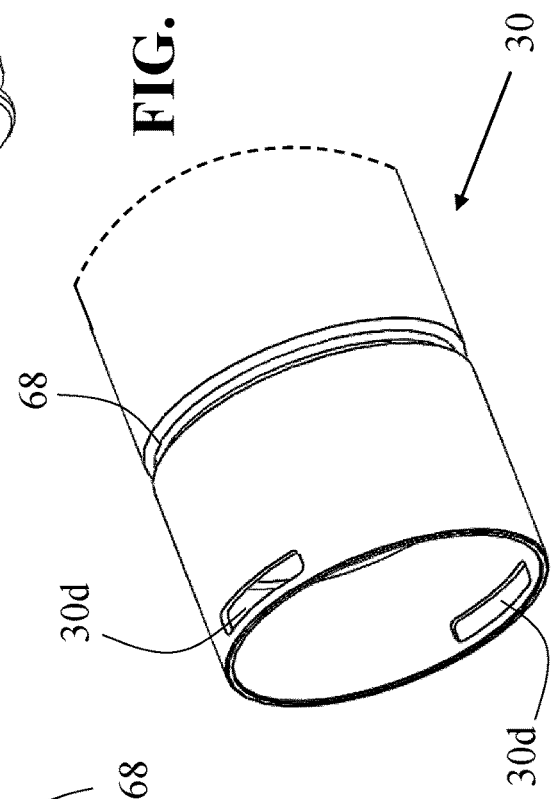
FIG. 7B
FIG. 7C
FIG. 7D

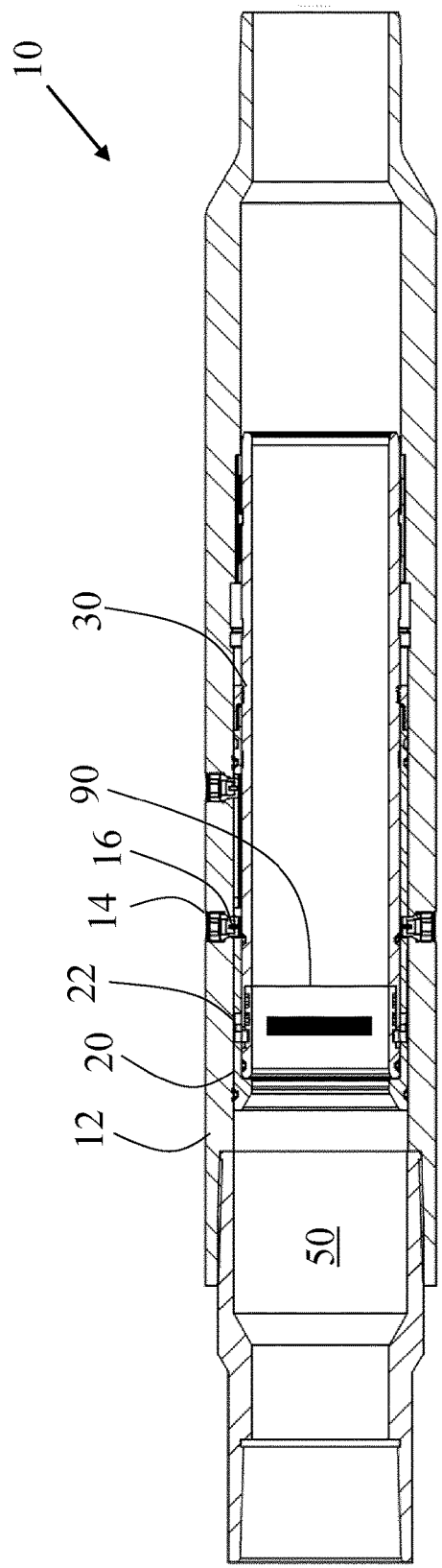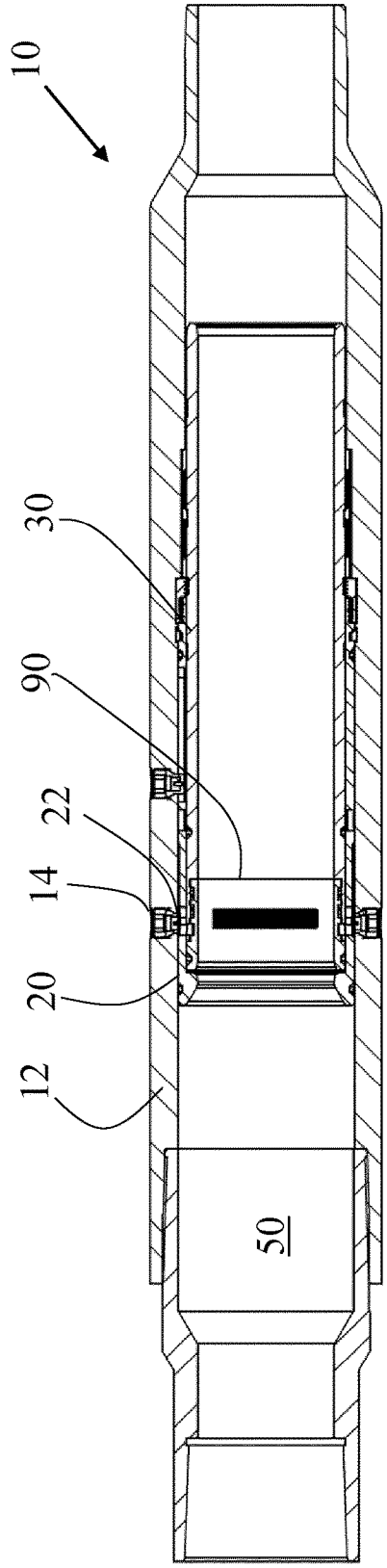
FIG. 8A
FIG. 8B

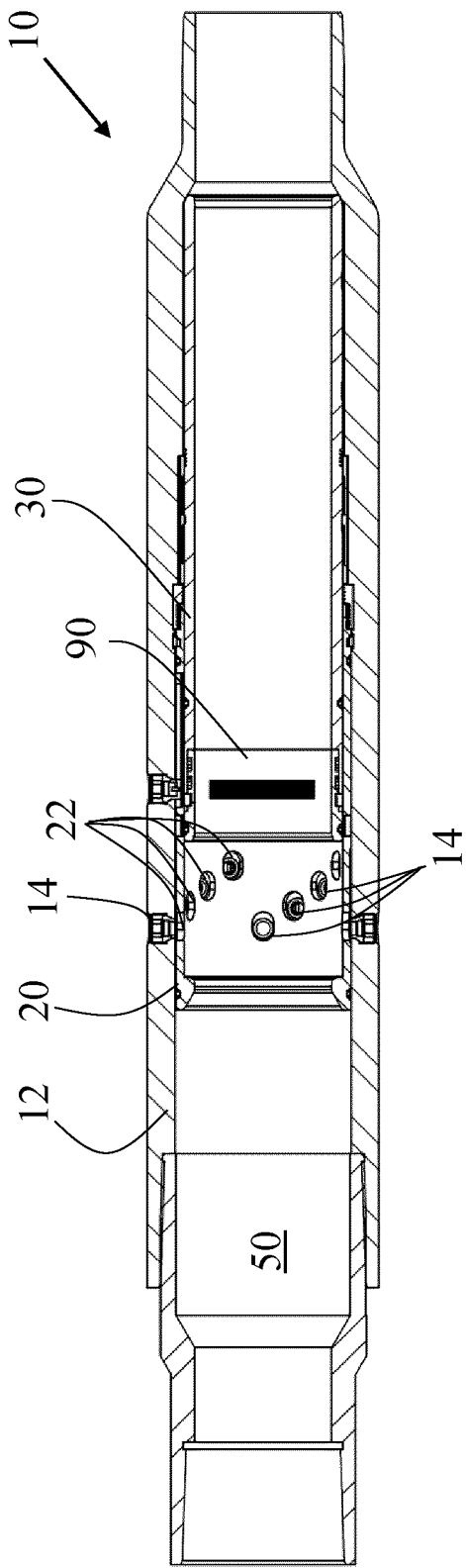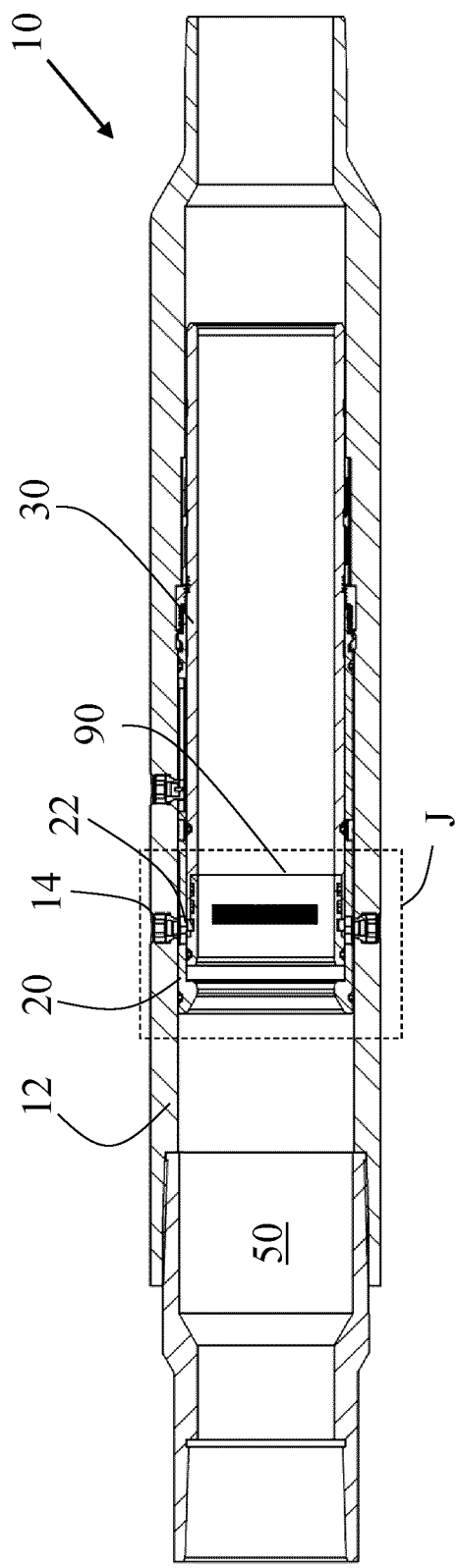

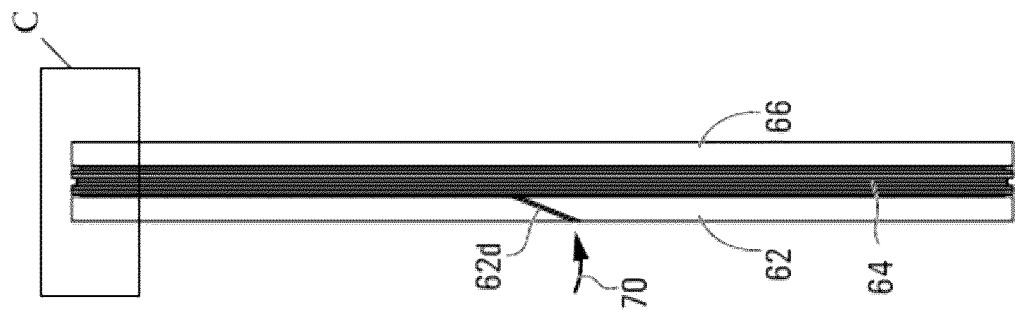
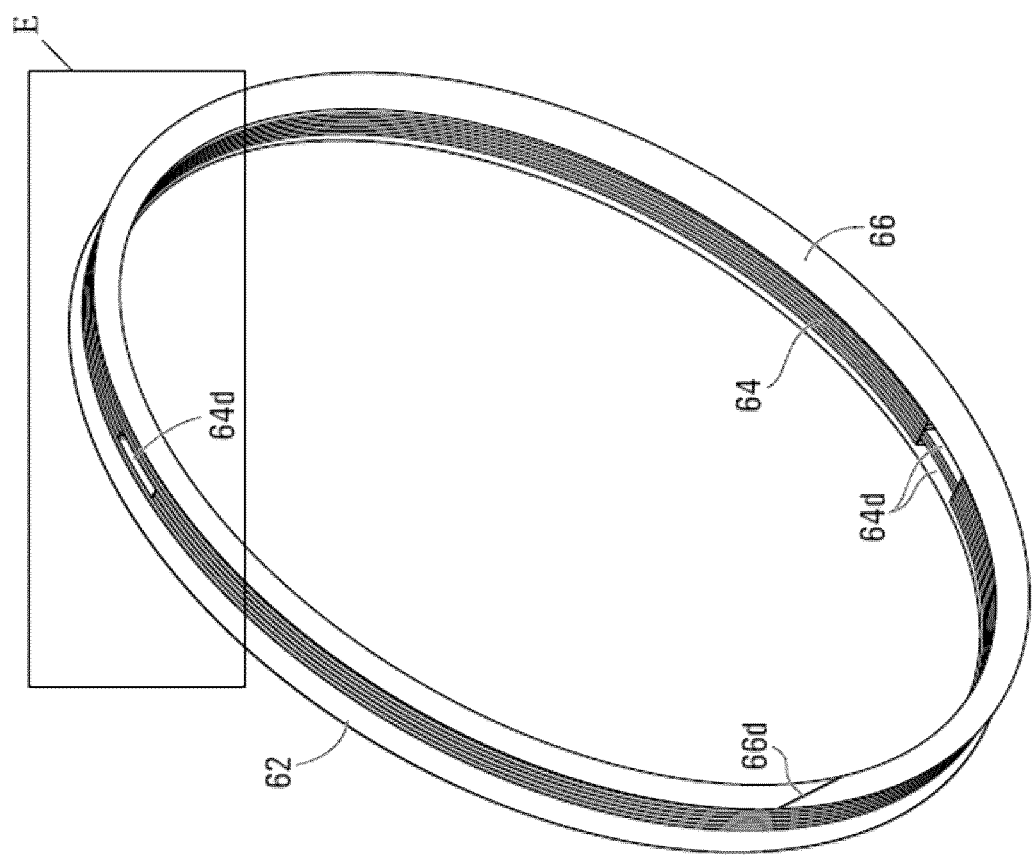
FIG. 9B
FIG. 9A

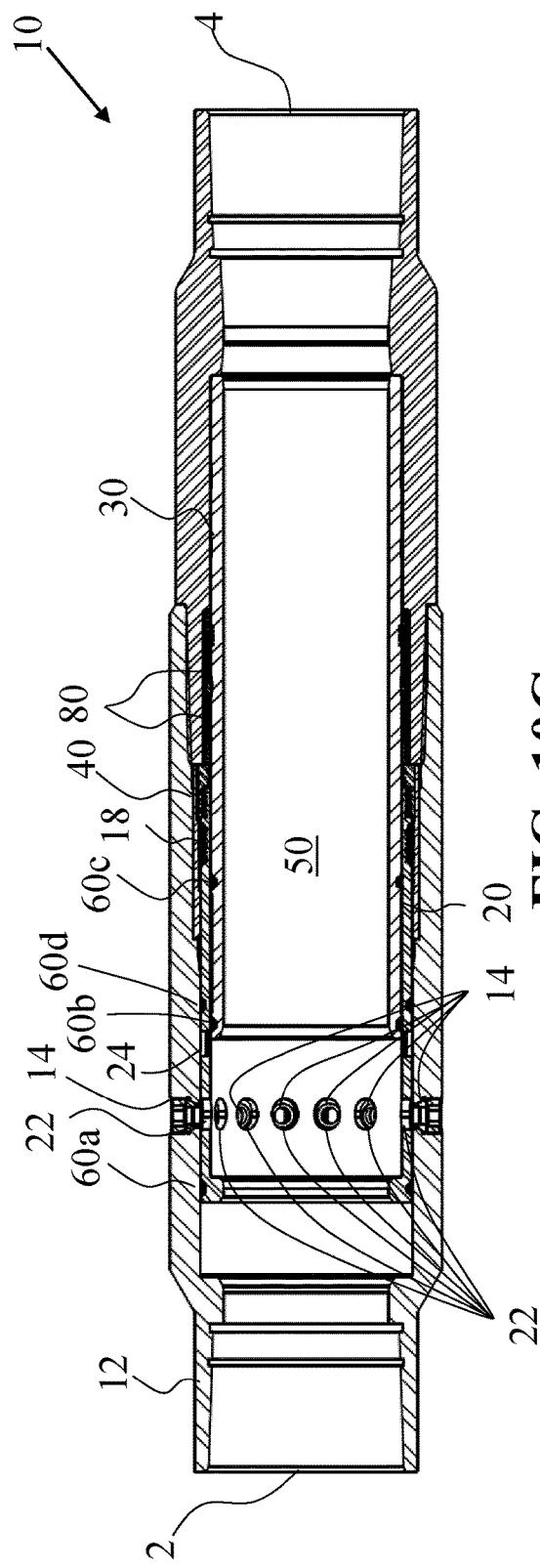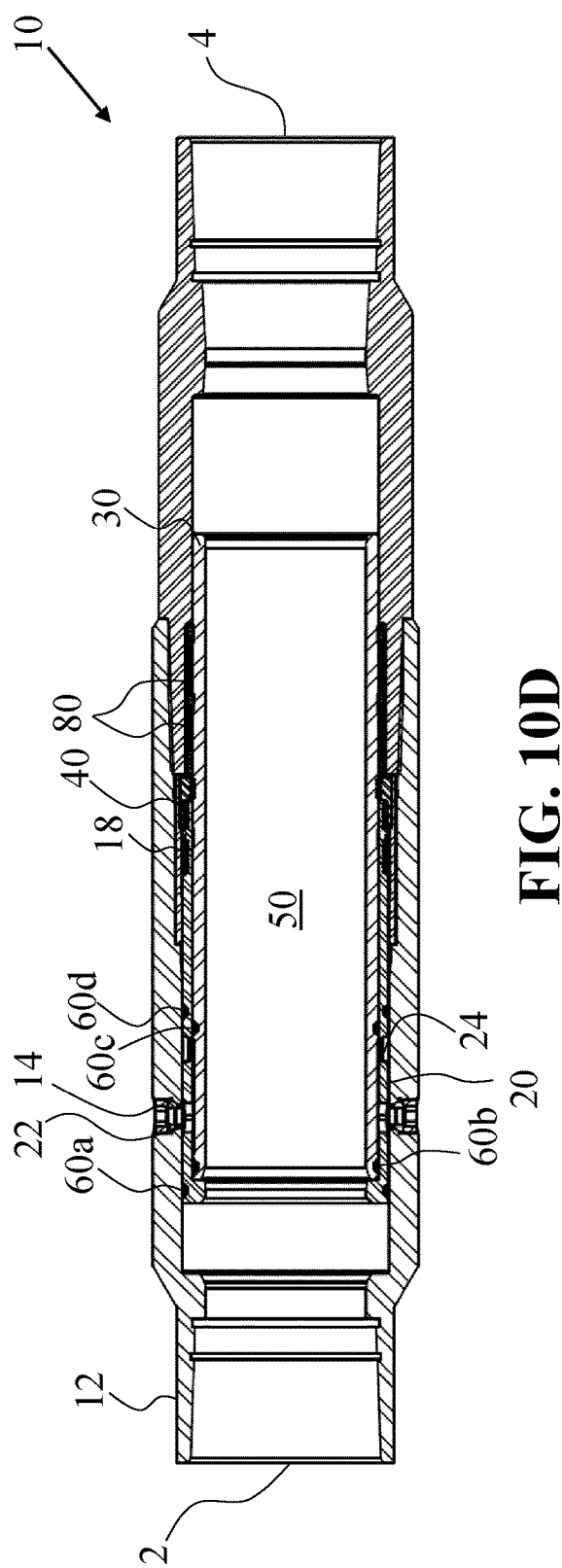

VALVE ASSEMBLIES FOR HIGH-TEMPERATURE WELLS

TECHNICAL FIELD

The disclosure relates generally to well completion operations, and more specifically to valve assemblies for downhole tools suitable for use in high-temperature wells, such as geothermal wells.

BACKGROUND

There are various types of downhole wells where high temperatures are encountered, including geothermal wells designed to capture geothermal energy. Geothermal energy is the thermal energy generated and stored in the Earth. A fluid is typically injected into the ground where it is heated. When the fluid is brought back to surface, the heat can be harvested. This may involve using the heat directly (e.g. to heat homes) and/or to generate electricity (e.g. using a turbine).

In a traditional geothermal system, hot water or steam is produced from a reservoir. In some systems, produced fluid directly drives a steam turbine in generation of electricity. In binary systems, heat is transferred at surface to a secondary working fluid that is used to drive a turbine to generate electricity.

More recently, Enhanced Geothermal Systems (EGS), also referred to as engineered geothermal systems, have been used to extract heat from hot reservoirs where there may be low natural permeability or fluid saturation. This concept offers great potential for dramatically expanding the use of geothermal energy into geographic areas that don't necessarily have hydrothermal reservoirs suitable for traditional geothermal systems.

Creating an EGS involves improving the natural permeability of rock in a reservoir by creating a subsurface fracture system. This is done by injecting fluid into a well and into the reservoir under carefully controlled conditions, which causes pre-existing fractures to re-open (and in some cases also creates new fractures within the reservoir), improving reservoir permeability. With increased reservoir permeability, a working fluid can be injected through the fractured rock, and transported through the reservoir to a production well where the heated working fluid is produced to surface.

Still further, closed loop geothermal systems have been described, otherwise known as Advanced Geothermal Systems (AGS). This typically involves the circulation of a working fluid in a closed loop through a hot reservoir to raise the temperature of the working fluid. At surface, thermal energy is transferred from the heated working fluid and converted to electricity.

The operational system may depend on the temperature of the formation, and whether or not the formation already carries a significant quantity of water.

Geothermal systems may therefore be open loop or closed loop. A closed loop geothermal system continuously circulates a heat transfer fluid through a sealed downhole conduit. The loop is filled just once and requires only a moderate amount of solution. The fluid never comes in direct contact with the formation, but the heat is transferred through the sealed conduit. In contrast, in an open loop geothermal system, the fluid is directed through the formation to collect heat directly from the rocks.

Since both geothermal and hydrocarbon energy production involve drilling wells into underground reservoirs, there are some similarities in the drilling, completion, and production operations and tools between both industries. However, there are also many significant differences, one being the much higher temperatures generally encountered in geothermal wells compared to oil and gas wells. In oil and gas wells, typical temperatures are 150° C. or less, with a "hot" well having a temperature of about 150-175° C. In comparison, much higher temperatures of about 200° C. to 600° C. are encountered in geothermal wells.

Because of the temperature differences between hydrocarbon wells and geothermal wells, tools designed for hydrocarbon wells are often not suitable for use in geothermal wells, as the tools cannot function as needed under the higher temperatures. One such tool is a valve assembly, which is used in hydrocarbon wells for regulating fluid flow between the well and the surrounding formation during completion and production operations. Valve assemblies designed for oil and gas operations are generally not capable of functioning in higher temperature geothermal wells.

Valve assemblies for use in hydrocarbon wells may be of the sliding sleeve type, wherein upon moving a sleeve within the assembly, one or more ports are opened or closed. The sliding sleeve can be actuated by a ball, dart or other isolating member, or alternatively, a shifting tool can be used to slide the sleeve.

Downhole valve assemblies for hydrocarbon wells rely on elastomeric materials for sealing and are designed to be used in wellbore operations with much lower temperatures than geothermal wells. Because of this, valve assemblies designed for hydrocarbon wells are not suitable for use in high temperature geothermal wells.

There is a need for valve assemblies that can be used for operations in geothermal wells where high temperatures are encountered.

SUMMARY

In accordance with the disclosure, there are provided embodiments for valve assemblies that are suitable for use in well operations where high temperatures are encountered, such as temperatures of 200° C. or higher, preferably 300° C. or higher, and preferably 300° C. to 600° C. High temperature wells include geothermal wells. The valve assemblies may have ports that can be opened to allow fluid flow between a fluid passageway in the valve assembly and the outside of the valve assembly (i.e., where a formation is located). The valve assemblies may use sealing assemblies comprising one or more materials that can function at high temperatures and don't require any polymeric materials, including elastomeric materials. The sealing assemblies may facilitate shifting the valve assembly between a first position, wherein fluid flow is blocked through the ports, and a second position, wherein there is a substantially open flow path through the ports.

The valve assemblies may comprise ports arranged to be opened sequentially instead of all at once. This arrangement of the ports that allows for sequential opening facilitates opening the valve assembly using a relatively low force given the flow area that is available through the ports.

The valve assembly may use a coupling member to couple a second sleeve to a first sleeve in the closed position, such that the second sleeve restricts flow between the fluid passageway and the ports until after all the ports have been opened. By restricting flow to the open port with the second sleeve, a lower pressure can be used to open the next port in the sequence. Once all the ports are open, the coupling member releases the second sleeve to allow relatively free fluid flow between the fluid passageway and the ports. This restriction of flow by the second sleeve may be accomplished using the sealing assemblies.

In some embodiments, after the valve assembly has been opened, the second sleeve can be closed to again restrict fluid flow through the ports. Restricting fluid flow may be done using the sealing assemblies. In some embodiments, fluid flow may be restricted using a flow restriction member.

In some embodiments, there is provided a valve assembly for downhole use in a high temperature well comprising:
- a tubular housing having:
  - a housing wall having an inner surface and an outer surface;
  - a fluid passageway defined within the tubular housing; and
  - at least one port in the housing wall for allowing fluid communication between the fluid passageway and outside the tubular housing;
- a first sleeve disposed in the tubular housing and longitudinally slidable with respect to the tubular housing; and
- at least one sealing assembly for restricting fluid flow between the fluid passageway and the at least one port, comprising:
  - at least one ring-shaped member in a radial groove that create a tortuous flow path through the at least one ring-shaped member from a first side of the radial groove to a second side of the radial groove to restrict fluid flow through the at least one sealing assembly.

In some embodiments, there is provided a valve assembly for downhole use in a high temperature well comprising:
- a tubular housing having:
  - a housing wall having an inner surface and an outer surface;
  - a fluid passageway defined within the tubular housing; and
  - at least one port in the housing wall for allowing fluid communication between the fluid passageway and outside the tubular housing;
- a first sleeve disposed in the tubular housing and longitudinally slidable with respect to the tubular housing from a first position to a second position;
- a second sleeve disposed in the first sleeve and longitudinally slidable with respect to the first sleeve between an open and a closed position; and
- a coupling member comprising an annular member having an inner surface that engages with an outer surface of the first sleeve and the second sleeve to couple the first and second sleeves together in the first position, and releases the second sleeve from the first sleeve in the second position.

In some embodiments, there is provided a valve assembly for downhole use in a high temperature well comprising:
- a tubular housing having:
  - a housing wall having an inner surface and an outer surface;
  - a fluid passageway defined within the tubular housing;
  - a plurality of ports in the housing wall for fluid communication between the fluid passageway and outside of the tubular housing; and
  - a plurality of plugs, with one plug in each port, the plug being shearable to change the port from a closed position, in which the plug seals the port from fluid flow, to an open position, in which the plug is at least partially removed to allow fluid flow through the port; and
- a first sleeve disposed in the tubular housing and longitudinally slidable with respect to the tubular housing from a first position, where the first sleeve is engaged with the tubular housing by the plugs, to a second position where the plugs have sheared and released the first sleeve from the tubular housing;
- wherein the ports and plugs are arranged to be sheared sequentially as the first sleeve moves from the first position to the second position.

The valve assembly can withstand temperatures of at least 200° C., preferably at least 300° C., preferably at least 400° C., more preferably at least 500° C., and more preferably at least 600° C. The high temperature well may be a geothermal well.

The at least one sealing assembly may consist of non-polymeric material. The at least one ring-shaped member may comprise a plurality of rings. The at least one ring-shaped member may comprise a coiled member having a plurality of rings. The rings of the at least one sealing assembly may be arranged side by side in the radial groove, and each ring may have a body with a first side face and a second side face. At least one of the rings may have a gap in its body to allow fluid flow through the body between the first and second side faces. The gap may comprise a slit through the body of the ring at an angle with respect to the radial axis of the ring. Multiple rings may comprise gaps through their bodies, and the gaps of adjacent rings may not be aligned. There may be an inter-ring gap between adjacent rings for allowing fluid flow between adjacent rings. The inter-ring gap is between the ring bodies. The radial groove may be defined by a first side wall, a second side wall, a top surface and a bottom surface. The first side wall and the second side wall may be at obtuse angles with respect to the bottom surface. The obtuse angle may be from about 120 degrees to about 150 degrees. The at least one ring-shaped member may have side faces, and the side faces adjacent the first and second side walls may be substantially parallel to the side walls. The at least one ring-shaped member may be metal.

Increasing longitudinal fluid pressure on the at least one sealing assembly may increase flow resistance in the at least one sealing assembly. Increasing longitudinal fluid pressure on the at least one sealing assembly may compress the rings against one of the first and second side walls to increase flow resistance in the at least one sealing assembly.

There may be at least two sealing assemblies, one being uphole of the at least one port and one being downhole of the least one port.

The valve assembly may further comprise a plug disposed in the at least one port and changeable from a closed position, in which the plug maintains a fluid seal in the at least one port, to an open position, in which fluid can flow through the at least one port. The plug may be shearable to change it from the closed position to the open position. Shearing the plug may allow the first sleeve to move in the tubular housing. During movement of the first sleeve in the tubular housing, the at least one sealing assembly may move past the sheared plug. The plug may be a closed-end hollow frangible plug. The plug may consist of non-polymeric materials.

The valve assembly may further comprise a second sleeve disposed in the first sleeve and longitudinally slidable with respect to the first sleeve between an open position, wherein the second sleeve does not substantially restrict fluid flow through the at least one port, and a closed position, wherein the second sleeve restricts fluid flow through the at least one port.

The first sleeve may further comprise at least one opening in its wall, and the first sleeve may be longitudinally slidable with respect to the tubular housing between a first position, wherein fluid flow between the at least one opening and the at least one port is restricted, and a second position, wherein there is a substantially open flow path between the at least one opening and the at least one port.

The valve assembly may further comprise a coupling member that allows for coupling and decoupling of the second sleeve and the first sleeve. The coupling member may be an annular member having an inner surface that engages with an outer surface of the first sleeve and the second sleeve to couple the first and second sleeves together in the first position, and releases the second sleeve from the first sleeve in the second position. The inner surface of the annular member may comprise radial grooves that engage with corresponding radial grooves in the outer surface of the first sleeve and/or the second sleeve to couple the first and second sleeves together. The inner surface of the annular member may have a first area with first radial grooves that engage with corresponding radial grooves on the first sleeve; and a second area with second radial grooves that engage with corresponding radial grooves on the second sleeve. The coupling member may expand into a coupling recess in the tubular housing when the first and second sleeve move from the first position to the second position to release the second sleeve from the first sleeve.

The first sleeve may have at least one opening in its wall, and in the first position, fluid flow between the at least one opening and the at least one port may be restricted, and in the second position, there may be a substantially open flow path between the at least one opening and the at least one port. In the open position, the second sleeve may not substantially restrict fluid flow through the at least one port, and in the closed position, the second sleeve may restrict fluid flow through the at least one port.

The valve assembly may further comprise a plug disposed in the at least one port and changeable from a closed position, in which the plug maintains a fluid seal in the at least one port, to an open position, in which fluid can flow through the at least one port.

Each plug may be engaged in a slot in the first sleeve wall prior to shearing. The slots may have various lengths along the longitudinal plane of the valve assembly, and the plugs may be configured to shear in sequence based on the length of the slot they are engaged with, from the shortest slot to the longest slot. Each slot has a downhole edge and an uphole edge, and at least one of the downhole or uphole edges of the slots may be aligned in a transverse plane. Alternatively, or in addition, at least one of the downhole or uphole edges of the slots may be positioned in a different transverse plane than a corresponding downhole or uphole edge of the other slots, which determines the sequence in which the plugs shear. This means that at least one of the downhole edges of the slots is positioned in a different transverse plane than the downhole edges of the other slots and/or at least one of the uphole edges of the slots is positioned in a different transverse plane than the uphole edges of the other slots The ports and plugs may be located in more than one transverse plane in the tubular housing, with the plugs arranged to be sheared in sequence along the transverse planes. There may be multiple ports and plugs in at least one of the transverse planes, and the plugs in the same transverse plane may be shearable substantially simultaneously.

The plugs may be shearable using a shifting tool. The plugs may be shearable using an isolation member to increase fluid pressure in the fluid passageway.

At least some of the ports and plugs may not be aligned on the same longitudinal plane.

The valve assembly may further comprise a second sleeve disposed in the first sleeve and longitudinally slidable with respect to the first sleeve between an open position, wherein the second sleeve does not restrict fluid flow through the ports, and a closed position, wherein the second sleeve restricts fluid flow through the ports.

The valve assembly may further comprise a flow restriction member in the fluid passageway to restrict flow through the ports when the first sleeve is in the second position. The flow restriction member may increase the length and tortuosity of the fluid flow path to restrict flow. The flow restriction member may comprise a sleeve having a plurality of slits in its wall through which the flow path goes. The flow restriction member may comprise a sleeve having a tortuous groove in its outer wall through which the flow path goes.

BRIEF DESCRIPTION OF THE DRAWINGS

Various objects, features and advantages of the disclosure will be apparent from the following description of particular embodiments, as illustrated in the accompanying drawings. Similar reference numerals indicate similar components.

FIGS. 1A, 1B, 1C, 1D are cross-sectional side views of a valve assembly in accordance with one embodiment, showing the sequential movement of an outer sleeve and an inner sleeve of the valve assembly.

FIG. 1A shows the outer sleeve and inner sleeve in the first position, where the ports are closed.

FIG. 1B shows the outer sleeve and inner sleeve in the second position.

FIG. 1C shows the inner sleeve in the open position.

FIG. 1D shows the inner sleeve in the closed position.

FIGS. 5A, 5B, 5C, 5D, 5E are schematic side views of the outer sleeve of the valve assembly showing the sequential shearing of plugs as the outer sleeve moves from a first position (FIG. 5A) to a second position (FIG. 5E) to open ports in the tubular housing.

FIG. 7B is a perspective view of a flow restriction member from one side.

FIG. 7C is a perspective side view of the flow restriction member of FIG. 7B from another side.

FIG. 7D is a perspective view of a section of an inner sleeve into which the flow restriction member may be inserted.

FIGS. 8A, 8B, 8C, 8D are cross-sectional side views of a valve assembly having a flow restriction member, showing the sequential movement of the outer sleeve and the inner sleeve of the valve assembly.

FIG. 8A shows the outer sleeve and inner sleeve in the first position, where the ports are closed.

FIG. 8B shows the outer sleeve and inner sleeve in the second position.

FIG. 8C shows the inner sleeve in the open position.

FIG. 8D shows the inner sleeve in the closed position, wherein the flow restriction member restricts flow through the ports in the tubular housing.

FIG. 9A is a perspective view of an embodiment of a sealing assembly.

FIG. 9B is a side view of the sealing assembly of FIG. 9B.

FIGS. 10A, 10B, 10C, 10D are cross-sectional side views of a valve assembly in accordance with one embodiment, showing the sequential movement of an outer sleeve and an inner sleeve of the valve assembly.

FIG. 10A shows the outer sleeve and inner sleeve in the first position, where the ports are closed.

FIG. 10B shows the outer sleeve and inner sleeve in the second position.

FIG. 10C shows the inner sleeve in the open position.

FIG. 10D shows the inner sleeve in the closed position.

DETAILED DESCRIPTION

Figure 2:
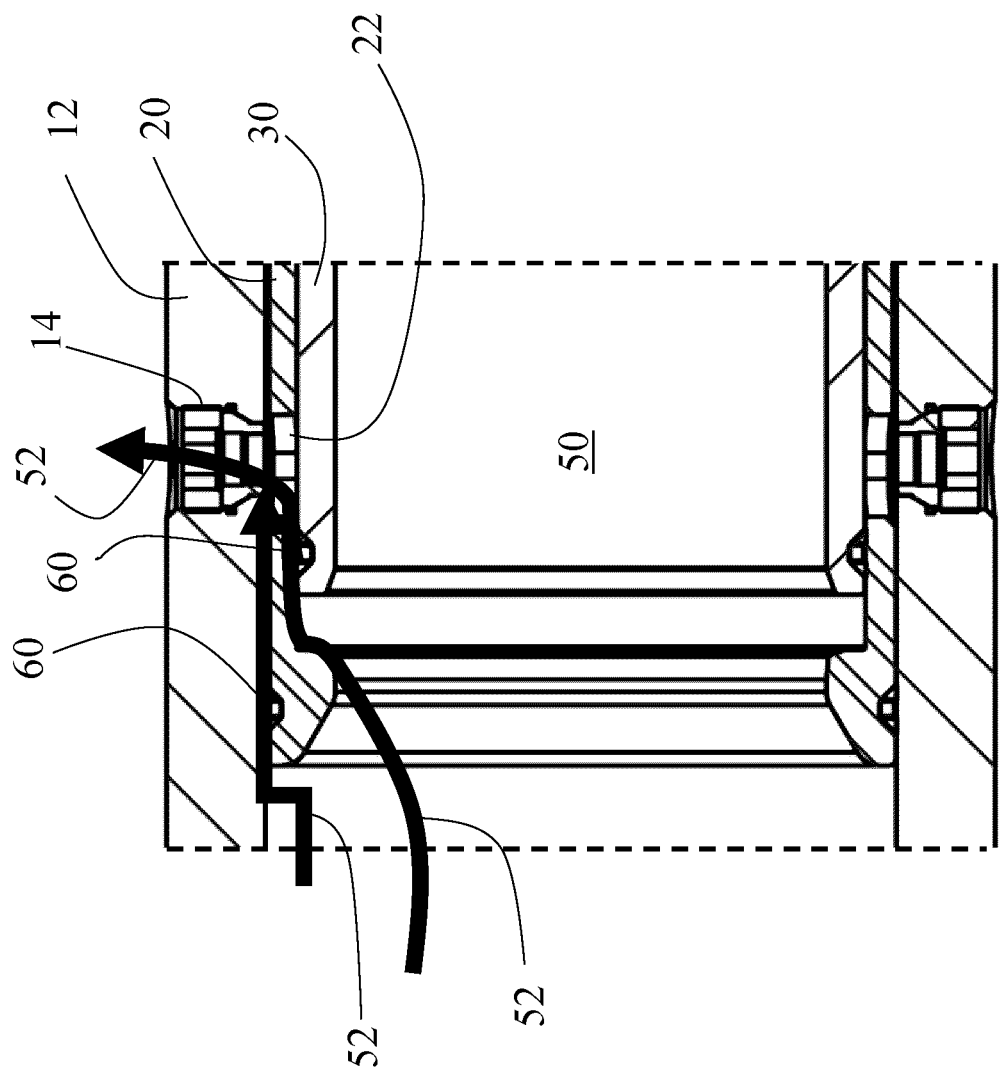
FIG. 2 is an enlarged view of area A in FIG. 1D showing the restricted flow pathway through a sealing assembly when the inner sleeve is in the closed position.

Illustrative implementations of one or more embodiments of the present disclosure are provided below, including numerous details to provide a thorough understanding of the disclosure. However, it will be apparent to one skilled in the art that various modifications can be made and/or that the specific details provided are not required to practice the present disclosure. The disclosure should in no way be limited to the illustrated and described embodiments, but may be modified and be within the full, intended scope of the present disclosure. A number of possible alternative features are introduced during the course of this description. It is to be understood that, according to the knowledge and judgment of persons skilled in the art, such alternative features may be substituted in various combinations to arrive at different embodiments of the present disclosure.

Prior art valve assemblies designed for hydrocarbon wells are generally not suitable for high temperature wells due to the elastomer seals used in the valve assemblies. Elastomers do not exhibit their normal properties at high temperatures. The temperature at which an elastomer can be used may greatly vary from elastomer to elastomer, but generally are no higher than 100° C. to 300° C. As such, prior art valve assembly systems relying on elastomer seals cannot be used reliably at the temperatures found in many geothermal wells.

Embodiments of the valve assemblies disclosed herein are suitable for use in high temperature wellbores where temperatures of 200° C. or higher, and preferably 300° C. to 600° C. are found. The valve assemblies do not rely on polymeric materials, including elastomers, for forming seals, but instead creates seals using materials that can withstand high temperatures, including various metals. High temperature wells include geothermal wells and other well types where high temperatures may be encountered, such in situ mining wells and waste disposal wells.

The valve assemblies disclosed herein are suitable for injection and production operations in high-temperature wells, such as geothermal wells. Injection operations can include fracturing the formation using stimulation fluids, such as those described in U.S. Provisional Patent Application No. 63/191,792 and PCT Patent Application No. PCT/CA2022/050806, which are hereby incorporated by reference. The valve assembly can be opened to allow a stimulation and/or injection fluid into the formation for fracturing. The valve assemblies are suitable for multistage fracturing operations.

Production operations include harvesting heat from the formation by injecting a working fluid into the geothermal well, using either a closed loop and/or open loop circulation. In a closed loop operation, the valve assembly may be re-closed to restrict the working fluid from coming into direct contact with the formation or fractured network containing the treatment fluid in one or more segments of the loop. In an open loop operation, the valve assembly can be open to allow the working fluid to flow between one or more zones in the formation and the surface, or it can be in a restricted position that restricts fluid flow between one or more zones in the formation and the well, or a substantially closed position to prevent the working fluid from coming into direct contact with one or more zones in the formation or fractured network. Restricting fluid flow into zones in the formation during production can be useful for regulating flow distribution. For example, flow can be restricted in zones where fluid is flowing too fast through the formation to be heated to the desired temperature before it is recovered, i.e., to manage the desired subcool. If flow is restricted enough, the restricted position may allow for restimulation of other zones.

Various aspects of embodiments of the valve assemblies will now be described with reference to the figures.

Valve Assembly Positions

One embodiment of the valve assembly is shown in FIGS. 1A-1D. Referring to FIG. 1A, the sliding sleeve valve assembly 10 generally includes a tubular housing 12 with a fluid passageway 50 through the center of it, and an outer sleeve 20 and an inner sleeve 30 that are longitudinally slidable to change the function of the valve assembly. In this embodiment, the valve assembly has four positions: a first position shown in FIG. 1A, a second position shown in FIG. 1B, an open position shown in FIG. 1C, and a closed position shown in FIG. 1D. The various positions may be used to allow, prevent or restrict fluid flow between the exterior of the valve assembly and the fluid passageway 50. The valve assembly may be incorporated in a wellbore string and used in a well to control fluid flow between the surrounding reservoir and the well surface.

The valve assembly 10 has an uphole end 2 and a downhole end 4. There are ports 14 in the wall of the tubular housing 12, extending between an outer surface 12a and an inner surface 12b of the tubular housing, which when open allow fluid flow through the ports.

In some embodiments as illustrated, the outer sleeve 20, also referred to as the first sleeve, is disposed in the tubular housing 12 and is longitudinally slidable with respect to the tubular housing. The outer sleeve 20 has openings 22 in its wall, through which fluid can flow between the fluid passageway 50 and the ports 14 in the tubular housing.

Each port 14 in the tubular housing 12 has a plug 16, which initially provides a fluid seal in the port when the outer sleeve 20 is in the first position of FIG. 1A. The plugs also couple the outer sleeve to the tubular housing. When downhole pressure is applied to the outer sleeve 20, the plugs 16 shear, removing at least a portion of each plug which releases the outer sleeve from the tubular housing so that it moves from the first position in FIG. 1A to the second position shown in FIG. 1B. Shearing the plugs also opens the ports 14.

Examples of suitable plugs are described in the Applicant's U.S. Provisional Patent Application No. 63/191,622 and PCT Patent Application No. PCT/CA2022/050809, which are herein incorporated by reference.

The plugs have been described as being shearable, however the plugs may also be opened via other means, including but not limited to being dissolved and/or crushed.

In some embodiments as illustrated, the inner sleeve 30, also referred to as the second sleeve, is disposed in the outer sleeve 20 and is longitudinally slidable with respect to the tubular housing 12 and the outer sleeve 20.

The inner sleeve 30 is initially coupled to the outer sleeve 20 in the first position in FIG. 1A such that when the outer sleeve moves to the second position in FIG. 1B, the inner sleeve moves with it. In the second position, the inner and outer sleeves decouple from one another, allowing the inner sleeve to be movable further downhole with respect to the outer sleeve and into the open position, shown in FIG. 1C. In the open position, the outer sleeve openings 22 are substantially unobstructed by the inner sleeve, thereby allowing fluid flow between the fluid passageway and the ports 14 by way of the outer sleeve openings 22. This open position provides the greatest fluid flow rate through the ports out of all the positions of the valve assembly and is generally suited for well production, injection and stimulation operations.

The open position provides a substantially open flow path between the ports and the fluid passageway. However, it is to be understood that the substantially open flow path may still include obstructions to fluid flow. For example, the plug in the port may not shear perfectly, leaving some debris in the port that impedes fluid flow. In another example, the outer sleeve openings 22 may not perfectly align with the ports 14 in the open position, or they may be of a different size or shape than the ports, both of which may impede fluid flow.

The inner sleeve 30 can be reclosed to move it from the open position in FIG. 1C to the closed position in FIG. 1D. In the closed position, the inner sleeve covers the outer sleeve openings 22, thereby restricting fluid flow between the fluid passageway 50 and the openings 22 and ports 14. Some fluid flow may still be permitted when the valve assembly uses sealing assemblies 60 that are imperfect seals that don't completely prevent fluid flow, but rather restrict fluid flow. FIG. 2 shows the flow pathway 52 through one of the sealing assemblies 60 when the valve assembly is in the closed position of FIG. 1D.

The closed position of the valve assembly that restricts the flow rate through the ports can be useful for regulating the distribution of fluid flow in a geothermal well. The inner sleeve may be moved between the open and closed position as many times as needed during use, to open or close pathways through the reservoir or through a closed loop to manage subcool.

Figure 3A:
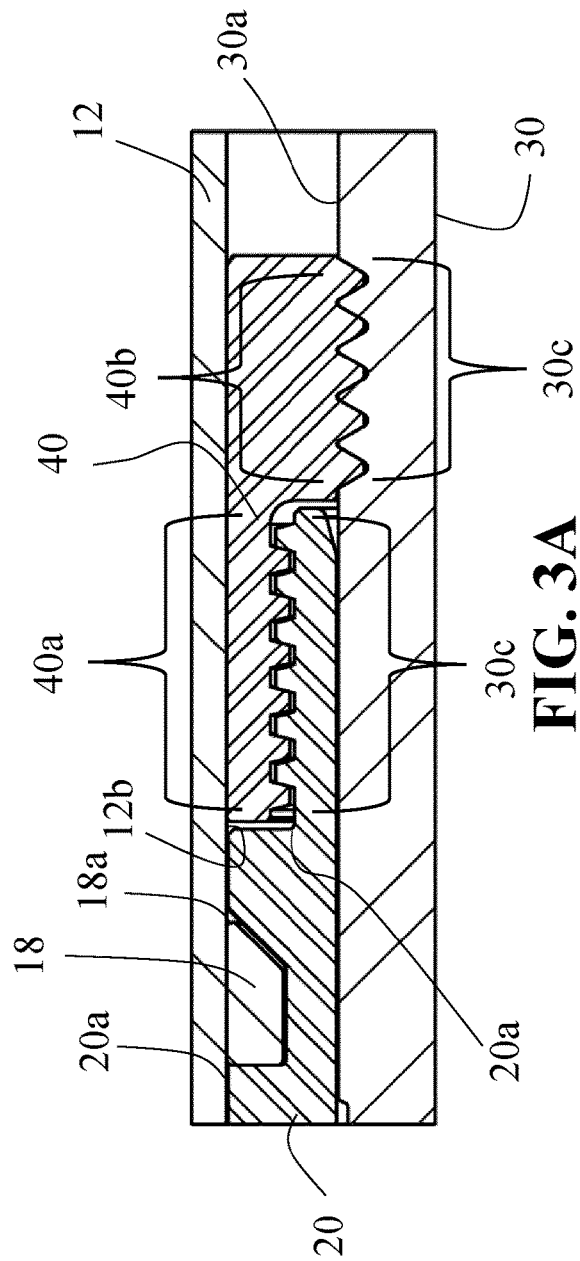
FIG. 3A is an enlarged view of area F in FIG. 1A showing the outer sleeve and inner sleeve coupled together with the coupling member in the first position.
Figure 3B:
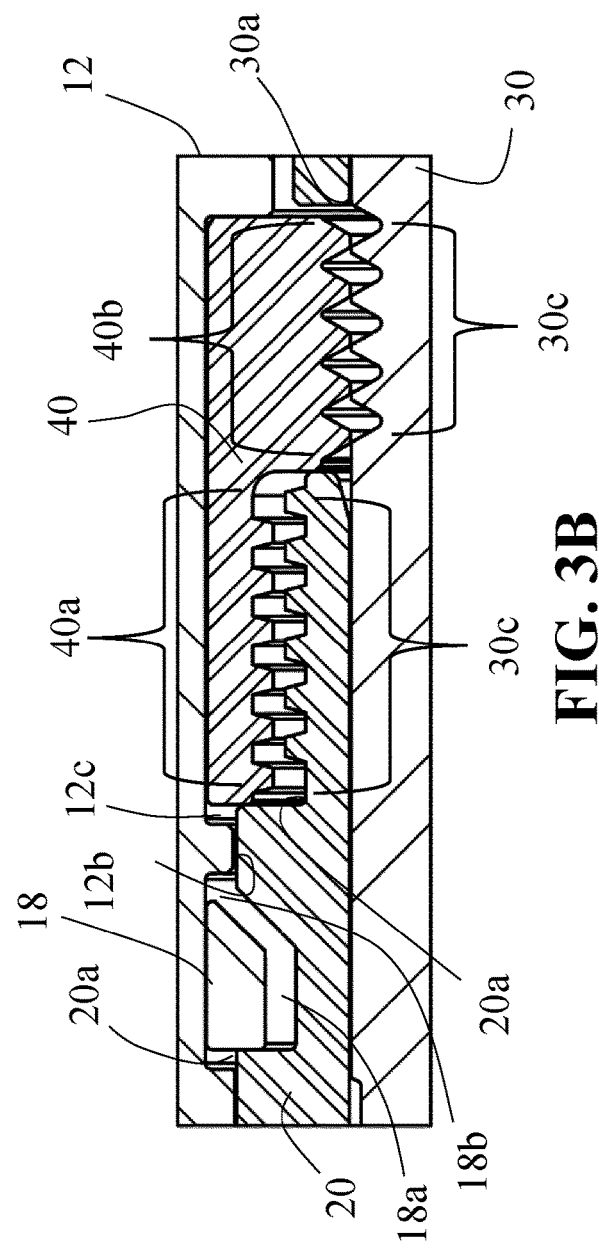
FIG. 3B is an enlarged view of area G in FIG. 1B showing the outer sleeve and inner sleeve uncoupled in the second position.

In some embodiments, the valve assembly 10 includes a locking member 18 to prevent the outer sleeve 20 from moving back to the first position in FIG. 1A from the second position in FIG. 1B. Referring to FIGS. 3A, 3B, the locking member 18 is preferably a ring disposed in an exterior lock channel 18a on the outer surface 20a of the outer sleeve. When the outer sleeve moves into the second position, the ring expands into an interior lock channel 18b on the inner surface 12b of the tubular housing 12, thereby preventing the outer sleeve from sliding with respect to the tubular housing.

The outer sleeve 20 and inner sleeve 30 may be initially coupled together via a coupling member 40, which is best seen in FIGS. 3A, 3B. The coupling member 40 preferably comprises an annular member that can engage and disengage with the outer and inner sleeves.

In the illustrated embodiments, the coupling member 40 has a first and second set of radial grooves 40a, 40b on its inner surface that engage with corresponding radial grooves 20c, 30c on the outer surface of the outer sleeve and inner sleeve, respectively. The radial grooves may comprise a threaded connection, for example where the radial grooves wind in a spiral formation around the inner surface of the coupling member and the outer surface of the outer sleeve and inner sleeve. When the outer and inner sleeve are in the first position, shown in FIGS. 1A, 3A, the radial grooves 40a, 40b of the coupling member interlock with the corresponding radial grooves 20c, 30c in the outer and inner sleeves to couple the sleeves together. When the outer and inner sleeve move into the second position, shown in FIGS. 1B, 3B, the coupling member 40 expands into a recess 12c in the tubular housing inner surface 12b, thereby disengaging the radial grooves from the corresponding radial grooves in the outer and inner sleeves and uncoupling the outer and inner sleeves. Once the outer and inner sleeves are uncoupled, the inner sleeve can move longitudinally with respect to the outer sleeve into the open position in FIG. 1C.

While the coupling member 40 has been described and illustrated as engaging and disengaging with both the inner and outer sleeve, it can also maintain engagement with only one of the inner and outer sleeves while disengaging from the other sleeve, which also provides the intended function of decoupling the inner and outer sleeves.

The valve assembly 10 further comprises a collet member 80 around the inner sleeve 30 that retains the inner sleeve in its various positions by engaging with various retention grooves in the inner sleeve outer surface 30a. There is a first retention groove 32a engaged with the collet when the inner sleeve 30 is in the first position of FIG. 1A, a second retention groove 32b for retaining the inner sleeve in the second position of FIG. 1B and the closed position of FIG. 1D, and a third retention groove 32c for retaining the inner sleeve in the open position shown in FIG. 1C. Note that the first retention groove 32a may not be necessary for retaining the inner sleeve 30 in the first position, since the plugs 16 and coupling member 40 retain the outer sleeve 20 and inner sleeve 30 in the first position.

The collet member 80 preferably includes collet fingers which exert a bias load against the retention grooves of the inner sleeve 30 to retain the inner sleeve in position. A shifting tool may be used to overcome the bias load of the collet fingers, thereby allowing the inner sleeve to shift to another position.

Sealing Assemblies

In some embodiments, the valve assembly 10 includes one or more sealing assemblies 60 for restricting flow between the fluid passageway 50 and the ports 14. The sealing assemblies 60 may be imperfect seals that don't completely prevent fluid flow, but rather restrict fluid flow. The sealing assemblies are made of one or more materials that can withstand high temperatures above 320° C., including non-polymeric materials such as metals, graphite, carbon composite, silicone, silica, vermiculite, fiberglass, compressed non-asbestos, ceramic fiber, and calcium alumina silicate. The sealing assemblies do not include polymeric materials, including elastomers, or other materials that do not provide effective sealing at high temperatures above 320° C. The sealing assemblies preferably have low drag, low contact pressure, and are anti-galling to facilitate the movement of the outer sleeve 20 and inner sleeve 30 with low pressure.

The sealing assemblies 60 may be used throughout the valve assembly 10 to provide seals, which may be imperfect seals, between various members. For example, there may be one or more sealing assemblies between the tubular housing 12 and outer sleeve 20, including sealing assembly 60*a* uphole of the ports 14 and sealing assembly 60*d* downhole of the ports 14 in the position shown in FIG. 1A. There may be one or more sealing assemblies between the outer sleeve 20 and the inner sleeve 30, including sealing assembly 60*b* uphole of the openings 22 and sealing assembly 60*c* downhole of the openings 22 when the inner sleeve is in the closed position (FIGS. 1B, 1D). When the inner sleeve is in the open position (FIG. 1C), the uphole sealing assembly 60*b* may be positioned downhole of the openings 22, since it is not needed to restrict flow through the openings in this position.

Figure 4A:
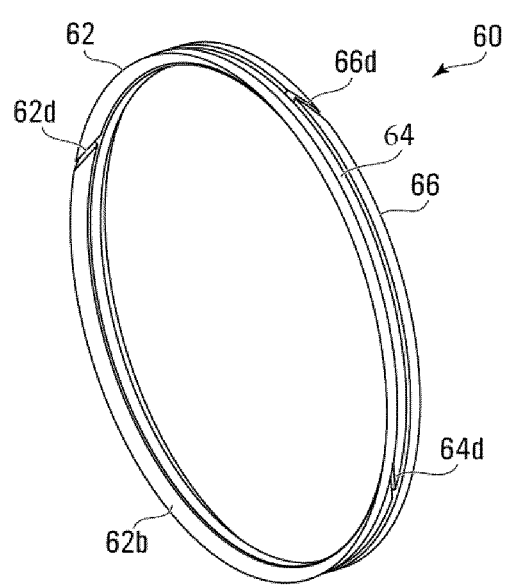
FIG. 4A is a perspective view of a sealing assembly.
Figure 4C:
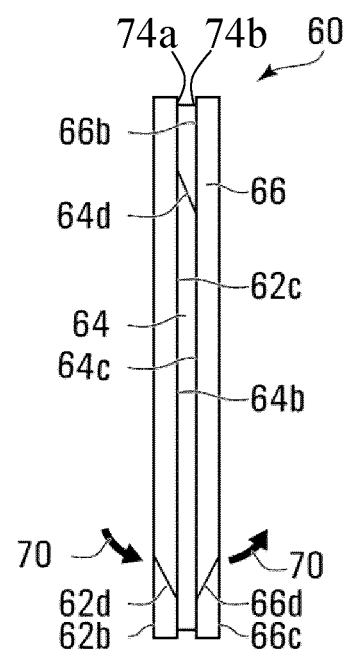
FIG. 4C is a side view of the sealing assembly of FIG. 4A.
Figure 4E:
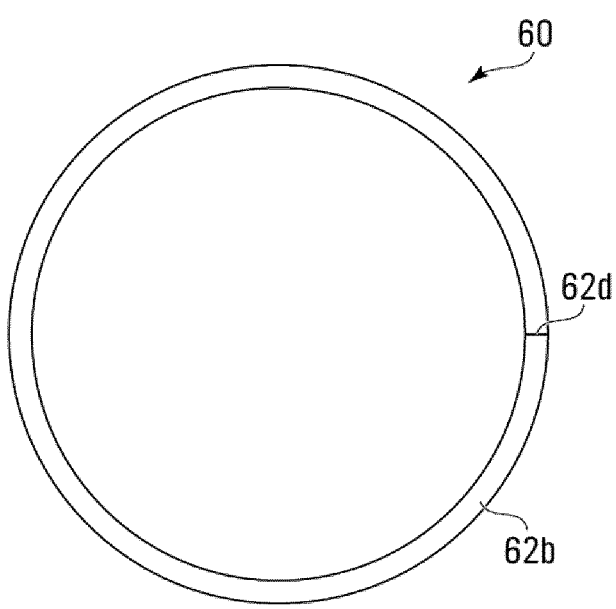
FIG. 4E is an end view of the sealing assembly of FIG. 4A.
Figure 4D:
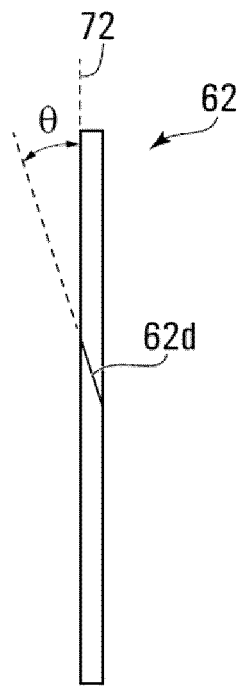
FIG. 4D is a side view of one of the rings of the sealing assembly of FIG. 4A.
Figure 4B:
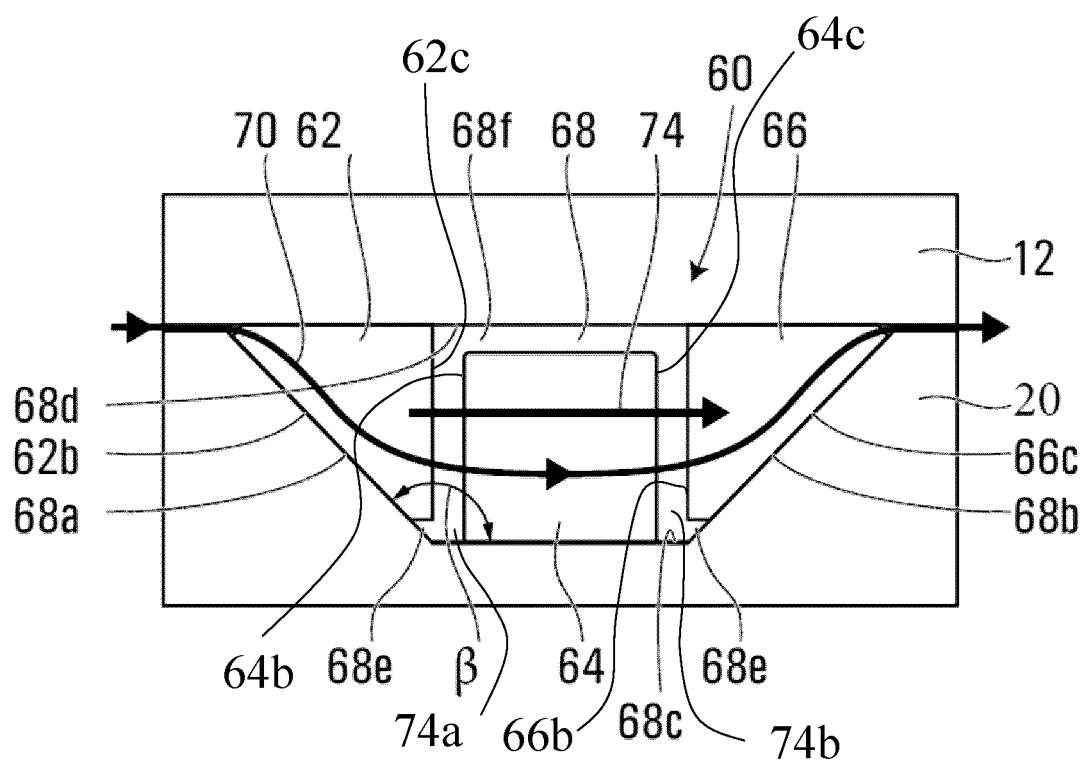
FIG. 4B is an enlarged view of area B in FIG. 1A showing the sealing assembly.

One embodiment of a sealing assembly 60 is shown in FIGS. 4A to 4E. In this embodiment, the sealing assembly comprises multiple rings 62, 64, 66 arranged in a radial sealing groove 68. The radial sealing groove is defined by a first side wall 68*a*, a second side wall 68*b*, a bottom surface 68*c*, and a top surface 68*d*, as best shown in FIG. 4B. The rings substantially fill the volume of the radial sealing groove.

The sealing assembly creates a long tortuous fluid flow path 70 through the radial sealing groove 68 through the rings 62, 64, 66, thereby slowing down and restricting fluid flow through the sealing assembly. The fluid flow path 70 can be in a downhole direction or an uphole direction. The fluid flow path can be from the fluid passageway to the outside of the valve assembly, or from the outside of the valve assembly into the fluid passageway. The sealing assemblies may restrict fluid flow by at least 50%, preferably at least 75%, and more preferably at least 90%. This flow restriction may occur at both relatively high and relatively low pressure, for example 2000 psi and 60 psi.

Each ring 62, 64, 66 of the sealing assembly 60 preferably has a ring body with a first side face 62*b*, 64*b*, 66*b* and a second side face 62*c*, 64*c*, 66*c*, as shown in FIG. 4C. The rings may be positioned side by side in the radial sealing groove 68, such that the side faces of adjacent rings abut one another. There may be an intra-ring gap 62*d*, 64*d*, 66*d* through each ring body to allow fluid flow through the ring body between the first side face 62*b*, 64*b*, 66*b* and the second side face 62*c*, 64*c*, 66*c* of each ring. In the illustrated embodiment, each intra-ring gap 62*d*, 64*d*, 66*d* is an angular slit through the ring body that is at an angle θ with respect to a radial axis 72 of the ring, as shown in FIG. 4D. The angle θ is preferably 45 degrees or less, preferably 30 degrees or less, and more preferably 15 degrees or less. The smaller the angle, the longer the flow path through the gap. The gap is preferably about 0 to about 0.125" wide when there is no pressure applied to the ring, and more preferably about 0 to about 0.020" wide.

There may also be an inter-ring gap between adjacent rings in the sealing assembly to allow fluid flow between the rings. For example, referring to FIGS. 4B and 4C, there may be an inter-ring gap 74*a* between the second side face 62*c* of the end ring 62 and the first side face 64*b* of the center ring 64. There may also be an inter-ring gap 74*b* between the second side face 64*c* of the center ring and the first side face 66*b* of the end ring 66. The gap is preferably about 0 to about 0.125" wide when there is no pressure applied to the sealing assembly, and more preferably about 0 to about 0.020" wide. The inter-ring gaps 74*a*, 74*b* form part of the tortuous fluid flow path through the sealing assembly. For example, referring to FIGS. 4B, 4C, the fluid flow path is as follows: through the intra-ring gap 62*d* in the end ring 62; through the inter-ring gap 74*a* between rings 62, 64; through the intra-ring gap 64*d* in the center ring 64; through the inter-ring gap 74*b* between rings 64, 66; and through the intra-ring gap 66*d* in the end ring 66. This flow pathway may also be reversed if fluid flow is moving in the opposite direction, i.e., from end ring 66 towards end ring 62. While the inter-ring gaps and intra-ring gaps are referred to as "gaps", the gaps do not necessarily comprise a void space, i.e., the gaps may have a width of 0" or near 0". This is particularly evident when pressure is applied to the sealing assembly which may reduce the width of the gaps.

As best shown in FIG. 4B, the radial sealing groove side walls 68*a*, 68*b* may be at an obtuse angle β to the radial sealing groove bottom surface 68*c*. The obtuse angle may be from about 120 degrees to about 150 degrees. The end rings 62, 66 in the sealing assembly 60 preferably have angled side faces 62*b*, 66*c* that face the radial sealing groove side walls 68*a*, 68*b* and are substantially parallel with the side walls. The side faces 64*b*, 64*c* of the middle ring 64, and the side faces 62*c*, 66*b* of the outer rings 62, 66 that face the middle ring are preferably substantially parallel with one another and at a right angle to the radial sealing groove bottom surface 68*c*. In other embodiments, the radial sealing groove side walls 168*a*, 168*b* are at a right angle to the radial sealing groove bottom surface 168*c*.

The long tortuous flow path 70 through the sealing assembly from one end of the sealing assembly to the other end involves fluid flowing through the intra-ring gaps 62*d*, 64*d*, 66*d* and the inter-ring gaps 74*a*, 74*b*. The intra-ring gaps 62*d*, 64*d*, 66*d* in adjacent rings are preferably offset from one another, i.e., not in alignment, as can be seen in FIG. 4A, to lengthen the fluid flow path by forcing the fluid to take a longer path through the inter-ring gaps 74*a*, 74*b* to reach the next intra-ring gap.

As fluid pressure increases on the sealing assembly 60, the rings 62, 64, 66 may be pushed toward the side wall of the radial sealing groove 68 that is opposite the direction of fluid flow, which in the case of the fluid flow path 70 in FIG. 4B, is towards the second side wall 68*b*, shown by arrow 74. This increases the pressure between adjacent rings and between the end ring 66 and the side wall 68*b*, compressing the sealing assembly 60 against the side wall 68*b*. This compression may increase the resistance encountered on the fluid flow path 70, such that an increase in fluid pressure increases the sealing ability of the sealing assembly 60 and decreases the flow rate of the fluid through the sealing ring.

The sealing assembly 60 has been illustrated and described as having three rings. In alternative embodiments, the center ring may be omitted so that there are only two rings. The two rings may have angled side faces that face the radial sealing groove side walls. Alternatively, one or more additional rings can be added between the end rings such that the sealing assembly has four or more rings.

The diameter of the sealing assembly rings 62, 64, 66 may vary to affect the flow path through the sealing assembly. In the embodiment shown in FIG. 4B, the end rings 62, 66 are sized to abut the top surface 68*d* of the radial groove, with a small inner gap 68*e* between the end rings and the radial groove inner surface 68*c*. The center ring 64 is sized to abut the bottom surface 68*c* of the radial groove, with a small outer gap 68*f* between the center ring and the radial groove top surface 68*d*.

Figure 9C:
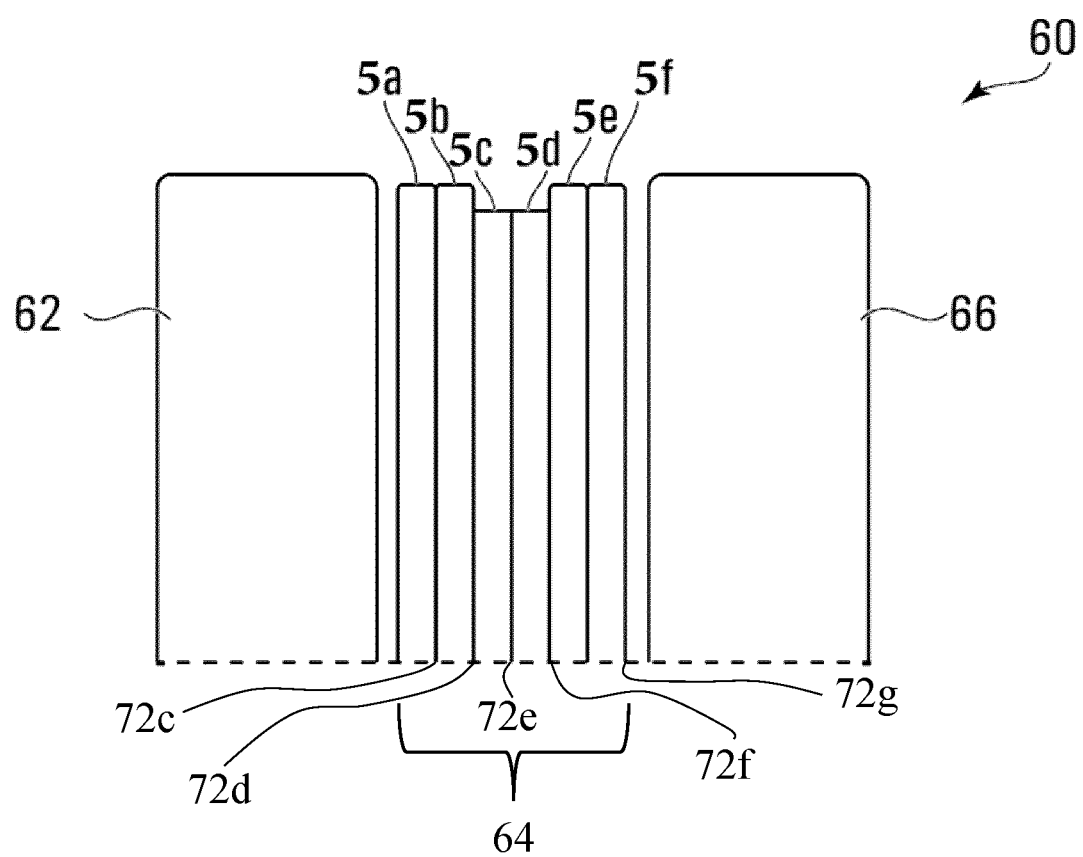
FIG. 9C is an enlarged view of area C in FIG. 9B showing the sealing assembly.
Figure 9E:
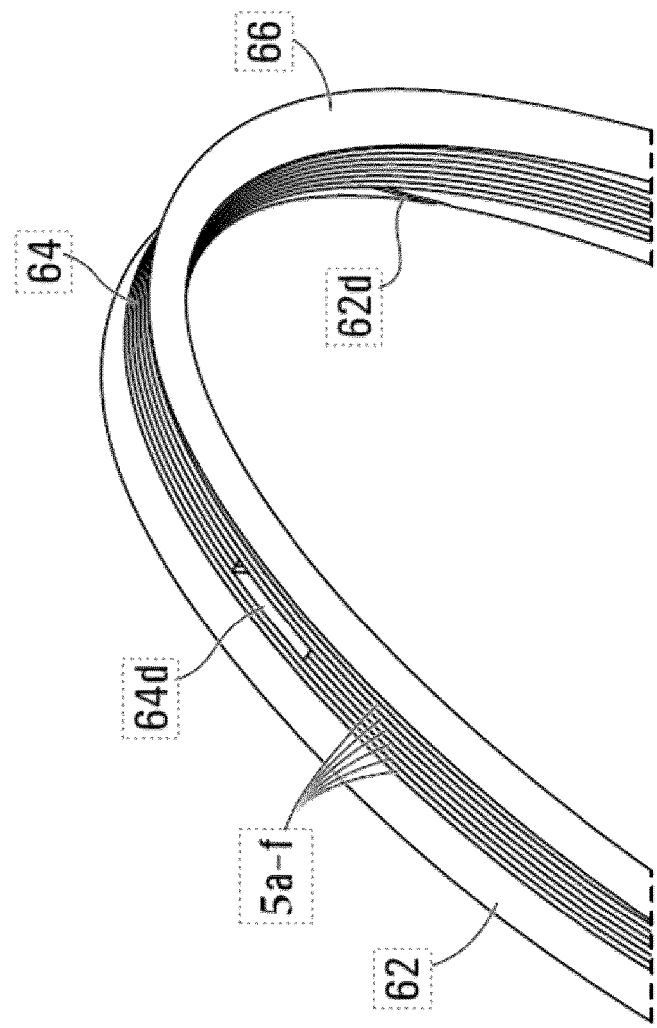
FIG. 9E is an enlarged view of area E of FIG. 9A showing the sealing assembly.
Figure 9D:
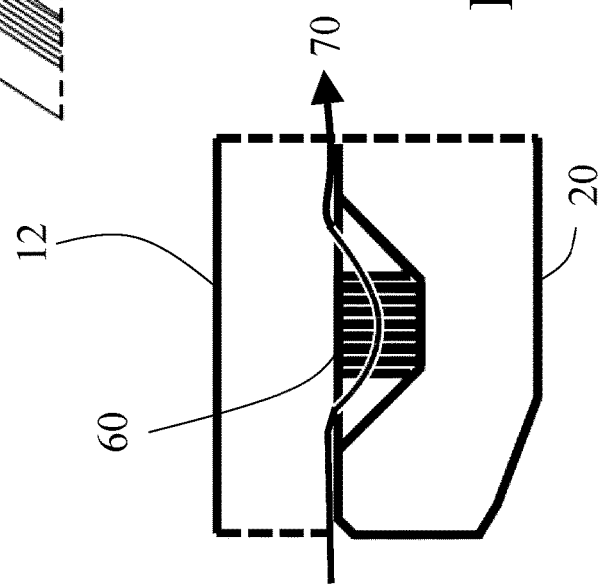
FIG. 9D is a schematic view showing the sealing assembly of FIG. 9A in a radial sealing groove of a valve assembly.
Figure 10A:
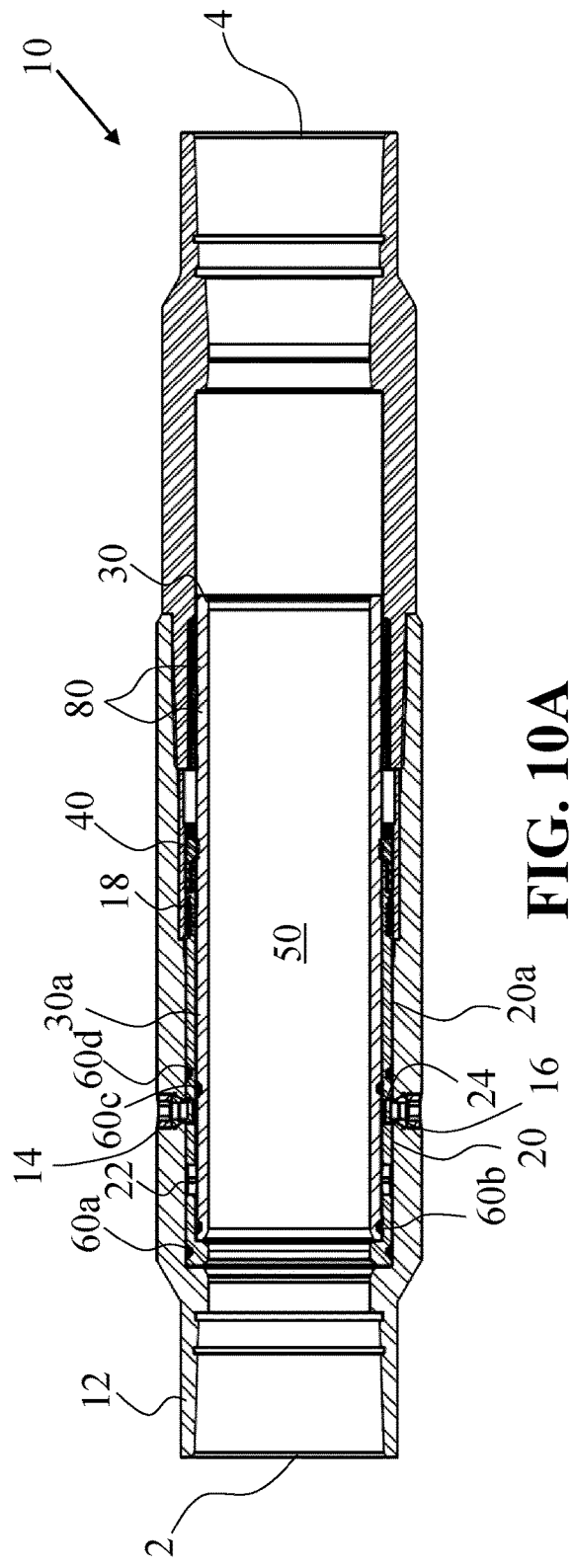
Figure 10B:
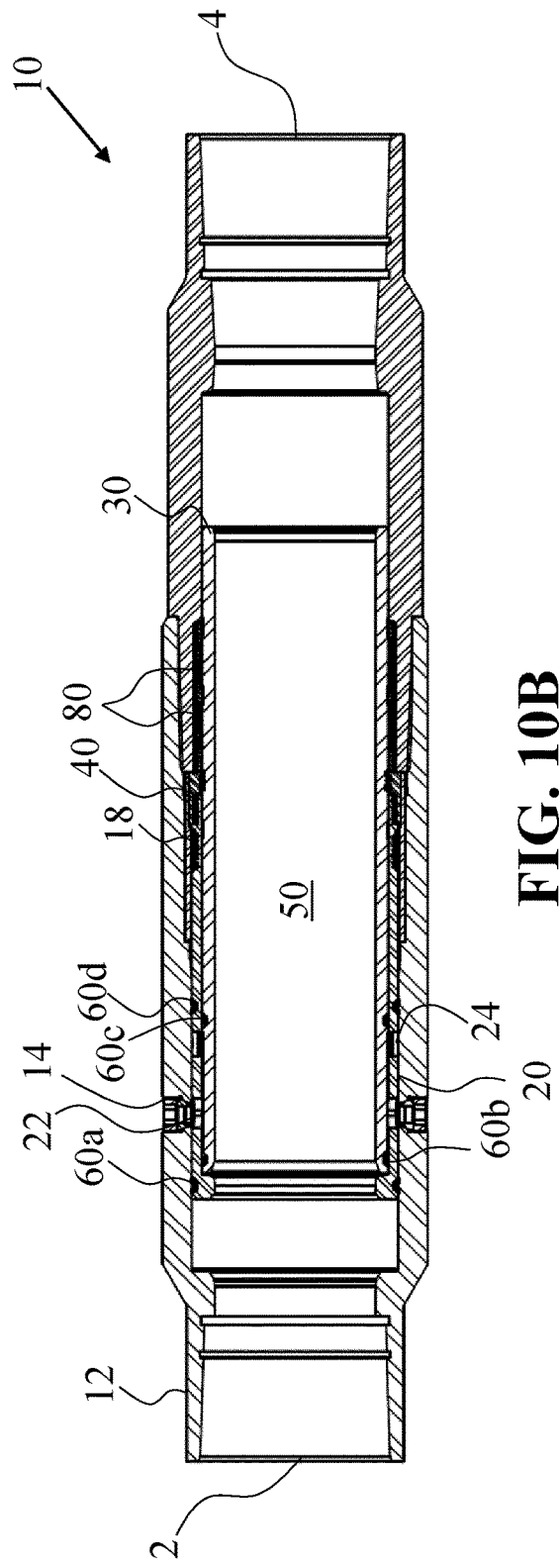
Figure 11:
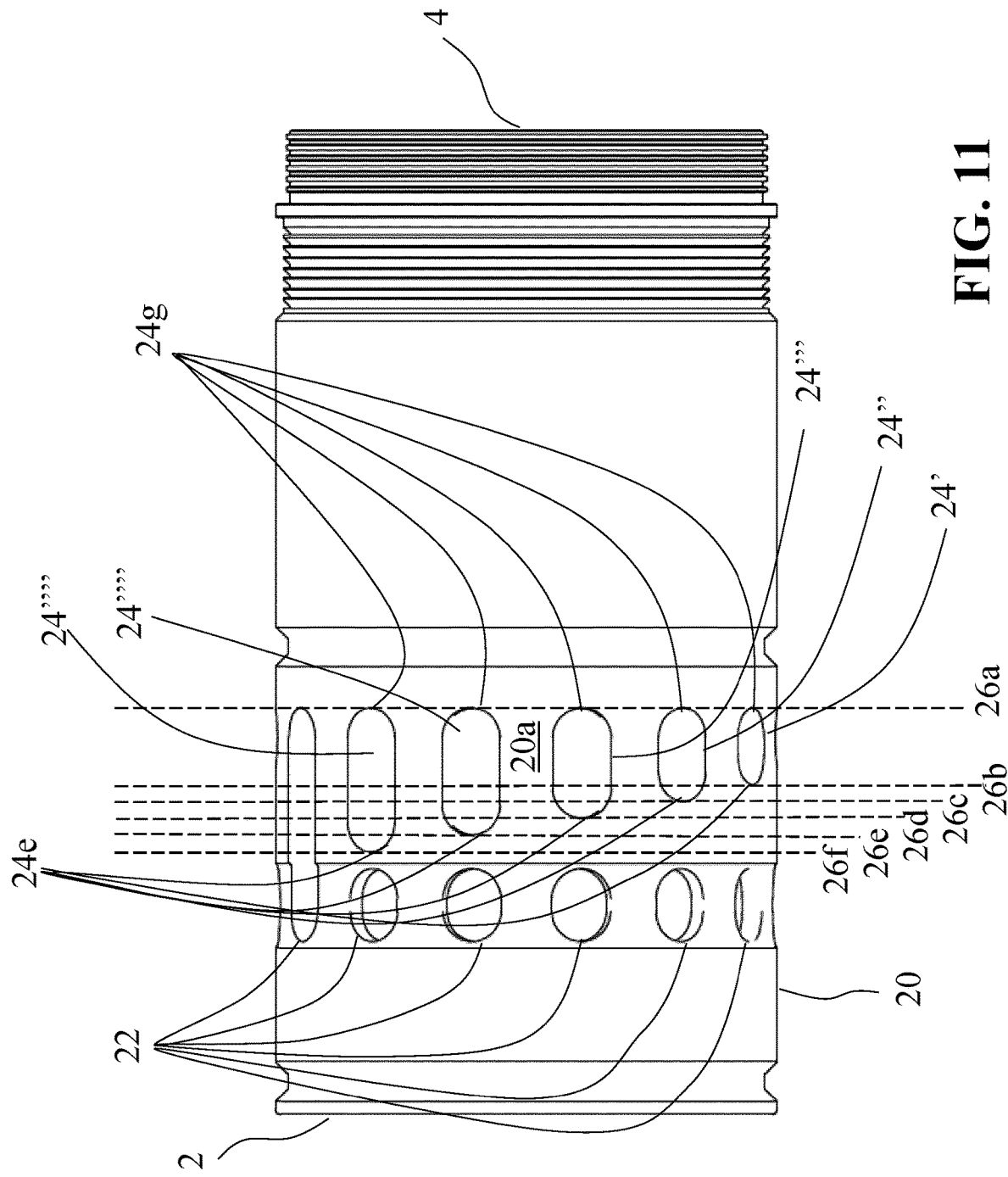
FIG. 11 is a partial side view of an outer sleeve of the valve assembly showing the configuration of the slots in the outer sleeve to allow for sequential opening of the ports of the valve assembly.

An embodiment of the sealing assembly 60 is shown in FIGS. 9A to 9E. In this embodiment, the outer rings 62, 66 are similar to the embodiment shown in FIGS. 4A to 4E; however, the center ring 64 is a coiled member comprising a plurality of rings that are helically wound. The coiled member may be referred to as a laminar seal ring. The fluid flow path through the helical rings may comprise one or more intra-ring gaps 64*d* (see FIG. 9A) in the bodies of the helical rings as well as inter-ring gaps 72*c,d,e,f,g* (see FIG. 9C) between adjacent rings to allow fluid to flow between adjacent helical rings and through the rings. In the illustrated embodiment, as best shown in FIG. 9C, the center ring comprises six helical rings 5*a-f*. The diameter of the rings 62, 64, 66 may vary to affect the flow path through the sealing assembly. The diameter of the helical rings of the coiled member 64 may also vary, as shown in FIG. 9C where helical rings 5*a,b,e,f* have a larger outer diameter than helical rings 5*c,d*.

While the example of the sealing assembly 60 in FIGS. 9A to 9E illustrates a coiled member 64 sandwiched between outer rings 62, 64, the sealing assembly may omit one or more of the outer rings. For example, the sealing assembly may comprise only the coiled member with the helically wound rings. It is to be understood that even though the helically wound rings may be connected together, they are still considered to comprise multiple rings since they wind around a center axis more than once.

It is to be understood that the term "ring" encompasses a ring-shaped member that may form a discontinuous ring. For example, there may be one or more intra-ring gaps in the circumference of the ring as described and illustrated herein.

The flow rate through the sealing assembly 60 can be adjusted as needed by adjusting the sealing assembly to make changes that affect the length and/or tortuosity of the flow path. For example, the angle θ of the intra-ring gaps 62*d*, 64*d*, 66*d* in the ring bodies can be adjusted. Another example is adjusting the placement of the intra-ring gaps 62*d*, 64*d*, 66*d* in adjacent rings 62, 64, 66, since the more offset the gaps are between adjacent rings, the longer the flow path. Another way to increase the length and tortuosity of the flow path is to increase the number of rings in the sealing assembly. The width of the intra-ring gaps and inter-ring gaps may also be adjusted to affect the flow path.

Opening of Ports

In some embodiments, there are multiple ports 14 in the tubular housing 12 which contain plugs 16 that are engaged with slots 24 in the outer surface 20*a* of the outer sleeve 20. Applying pressure to the outer sleeve causes the plugs to shear and the ports 14 to open, thereby moving the outer sleeve from the first position (FIG. 1A) to the second position (FIG. 1B).

The ports 14 may be arranged such that the plugs 16 in the ports can be sheared sequentially. The sequential shearing may be from the uphole direction to the downhole direction, or from the downhole direction to the uphole direction. By shearing the plugs sequentially, less force is required to open the ports than if all the plugs were sheared simultaneously. This means that for a given flow area, as determined by the size and number of the ports, less force is required to open the ports. It also means that the flow area through the ports can be increased without requiring an increase in the pressure required to open the ports.

Figure 6A:
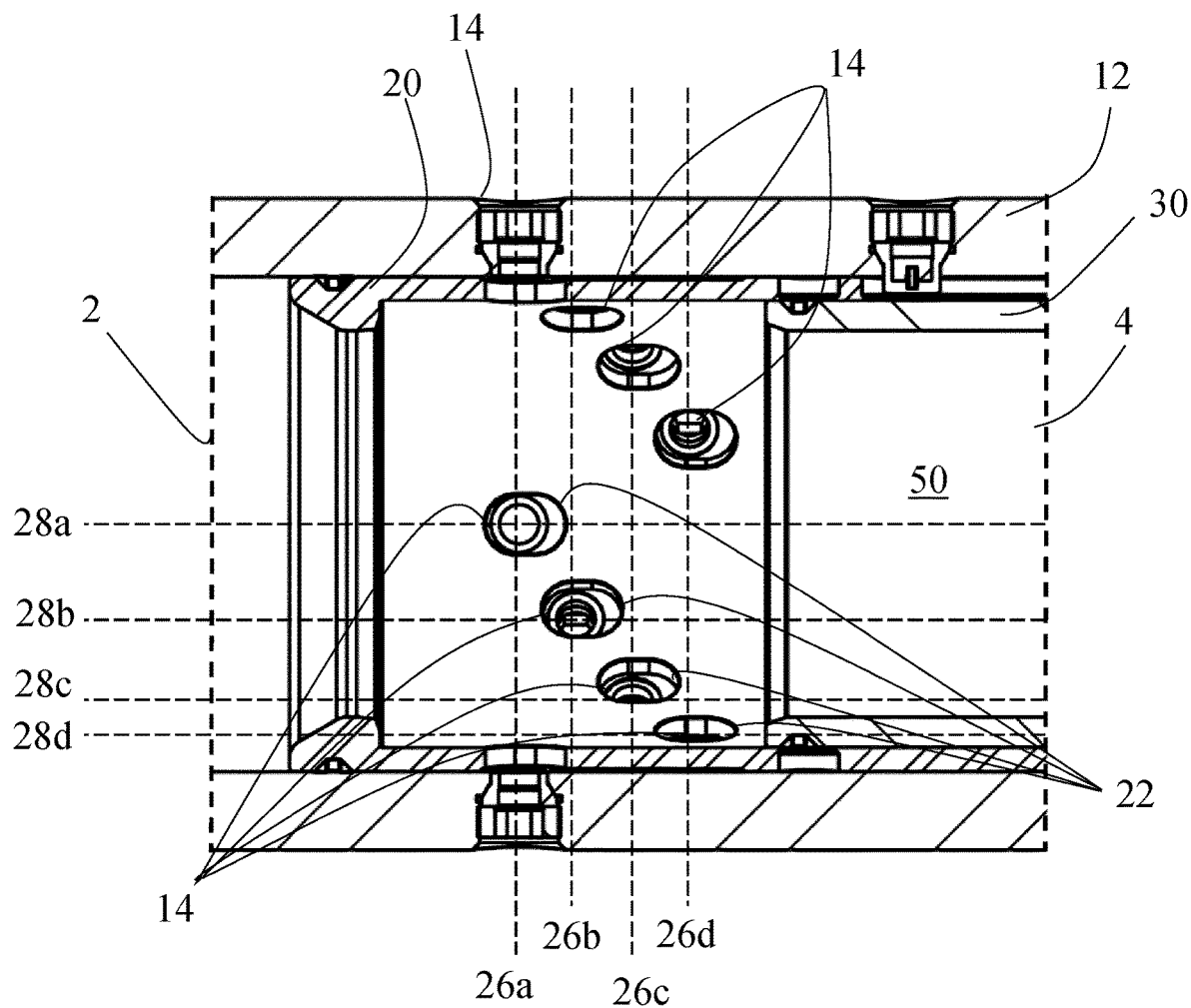
FIG. 6A is an enlarged view of area H in FIG. 1C showing openings in the outer sleeve aligned with open ports in the tubular housing when the inner sleeve is in the open position.

The ports 14 and plugs 16 may be arranged along multiple transverse planes in the tubular housing, as best seen in FIG. 6A, which shows four transverse planes 26*a,b,c,d* on which ports 14 are positioned. Having the ports on more than one transverse plane allows for the plugs in the ports to be sheared sequentially from the uphole direction to the downhole direction or vice versa. In FIG. 6A, the arrangement allows for shearing from the first plane 26*a* to the fourth plane 26*d*.

FIGS. 5A-5E show a portion of the outer sleeve 20 having slots 24*a,b,c,d* in the outer surface 20*a* that retain the plugs 16*a,b,c,d* and cause the plugs to shear when pressure in a downhole direction is applied to the outer sleeve. The slots 24*a,b,c,d* are preferably just in the outer surface 20*a*, rather than extending all the way through the wall of the outer sleeve 20.

FIGS. 5A-5E illustrate one embodiment of the sequential shearing of the plugs 16*a,b,c,d* in the multiple transverse planes 26*a,b,c,d* as the outer sleeve moves from the first position (FIG. 5A) to the second position (FIG. 5E), thereby opening the ports 14 in the tubular housing and creating a flow path between the openings 22 in the outer sleeve and the ports.

The slots 24*a,b,c,d* in the outer housing may have different lengths along the longitudinal plane of the valve assembly, allowing for sequential shearing of the plugs 16*a,b,c,d* retained in the slots. In FIG. 5A, the plugs are all intact and the ports are closed. As pressure is applied on the outer sleeve 20, which in the illustrated example is in a downhole direction (i.e. from the left side to the ride side of the drawings in FIGS. 5A to 5E), the pressure on the first plug 16*a* by the uphole end 24*e* of the slot 24*a* shears the first plug which is engaged with the shortest slot, moving the outer sleeve slightly downhole to the position in FIG. 5B. As this movement occurs, the intact plugs 16*b,c,d* slide within their respective slots 24*b,c,d*.

In FIG. 5B, the second plug 16*b* is at the uphole end 24*f* of slot 24*b*, and applying pressure shears the second plug to move the outer sleeve further downhole to the position in FIG. 5C. This can be repeated for the third plug 16*c* to move it from the position in FIG. 5C to FIG. 5D, and for the fourth plug 16*d* to move it from the position in FIG. 5D. Once the fourth plug 16*d* has sheared, the outer sleeve 20 may be released from the tubular housing 12, allowing the outer sleeve to move fully downhole to the second position in FIG. 5E. This causes the shearing of the plugs based on the length of the slot in which they are engaged, from the shortest to the longest slot.

In the second position of FIG. 5E, the outer sleeve has moved downhole enough that the ports from which the plugs sheared may be aligned with the openings 22 in the outer sleeve 20. This is seen in FIG. 6A, where the inner sleeve 30 has moved into the open position, creating a fluid flow path between the ports 14, openings 22 and fluid passageway 50.

FIG. 5A illustrates one plug 16*a,b,c,d* in each transverse plane 26*a,b,c,d*, however there can be multiple plugs in one or more of the transverse planes. When there are multiple plugs in a transverse plane, all the plugs in that plane may be configured to shear substantially simultaneously.

FIG. 5A illustrates four transverse planes containing plugs, however there may be various other numbers of transverse planes.

The number of ports in each transverse plane can vary. For example, there may be four ports in the first transverse plane, and two ports in the second, third and fourth transverse plane, for a total of 10 ports. Alternatively, each transverse plane may contain the same number of ports.

The ports 16 in the various transverse planes may be on the same longitudinal plane such that they are in line with each other, or they may be staggered on different longitudinal planes as shown in FIG. 6A, where there are various longitudinal planes 28a,b,c,d that the ports are on which creates a spiral pattern of ports around the tubular housing 12.

Another example of a port 14 and plug 16 configuration that allows for sequential shearing is shown in FIGS. 10A to 10D and FIG. 11. In this embodiment, the ports and plugs are arranged on the same transverse plane. The position and length of the slots 24 in the outer surface 20a of the outer sleeve 20 determines the sequence in which the plugs shear to open ports 14. The slots 24 have various lengths along the longitudinal plane of the valve assembly, with the downhole edges 24g of the slots being aligned along a transverse plane 26a. The uphole edges 24g of the slots are positioned along different transverse planes 26b,c,d,e,f. When the outer sleeve moves from the first position (FIG. 10A) to the second position (FIG. 10B), the plugs 16 engaged with the slots 24 slide within the slots. When the outer sleeve reaches a position where the uphole edge 24g of the slot abuts the plug and force is applied, the plug shears. In the example shown in FIG. 11A, the plugs shear sequentially based on the length of slot they are engaged with, from the shortest slot to the longest slot, i.e. in the order 24', 24'', 24''', 24'''', 24'''''.

It is to be understood that while the illustrated examples may show shearing the plugs from the downhole direction to the uphole direction, the shearing sequence may be reversed, i.e. from the uphole to the downhole direction, by adjusting the features of the assembly that determine the shearing sequence (for example, the position and length of the slots).

The plugs 16 retained in the ports 14 may be closed-end hollow frangible plugs, sometimes referred to as kobes. A closed-end hollow frangible plug may have a closed-end that inserts into the slot 24 in the outer sleeve 20. When the plug is sheared, the closed-end of the plug breaks off to open up a hollow channel through the plug, thereby creating a flow pathway through the plug and opening up the port 14 that the plug is in.

The valve assembly 10 may comprise an alignment member to prevent rotation of the outer sleeve 20 with respect to the tubular housing 12. In FIGS. 1A, 1B, the alignment member is shown as an alignment plug 42 that slides within a longitudinal slot 44 in the outer sleeve outer surface 20a that is sized to allow longitudinal movement but prevent rotation. This alignment plug 42 does not shear during movement of the outer sleeve. In the example shown in FIG. 11, slot 24f is an alignment slot that is engaged with an alignment member of the tubular housing 12 to prevent rotation of the outer sleeve 20 with respect to the tubular housing during movement of the outer sleeve 20 from the first position to the second position. The alignment member may be a plug or another suitable alignment member such as a key or pin. Other suitable ways for engaging an alignment member with the outer sleeve may be used.

Flow Restriction Member

In some embodiments, the valve assembly 10 includes a flow restriction member 90 for restricting fluid flow between the fluid passageway 50 and the ports 14. In the embodiment shown in FIGS. 8A-D, the flow restriction member 90 is a sleeve that is operatively engaged with an end of the inner sleeve 30 such that it slides with the inner sleeve between the various positions of the inner sleeve, i.e., the first position in FIG. 8A, the second position in FIG. 8B, the open position in FIG. 8C, and the closed position in FIG. 8D.

In the closed position in FIG. 8D, the flow restriction member 80 is positioned over the openings 22 in the outer sleeve 20 to restrict flow through the openings and thus through the ports 14. In the open position in FIG. 8C, the flow restrictor does not cover the outer sleeve openings 22 and thus does not restrict flow through the openings 22 and ports 14.

FIG. 8A illustrates the outer sleeve 20 and inner sleeve 30 in the first position, where the flow restrictor covers the openings 22, but the ports 14 are closed and thus the flow restrictor isn't being used to restrict flow through the ports in this position.

Figure 7A:
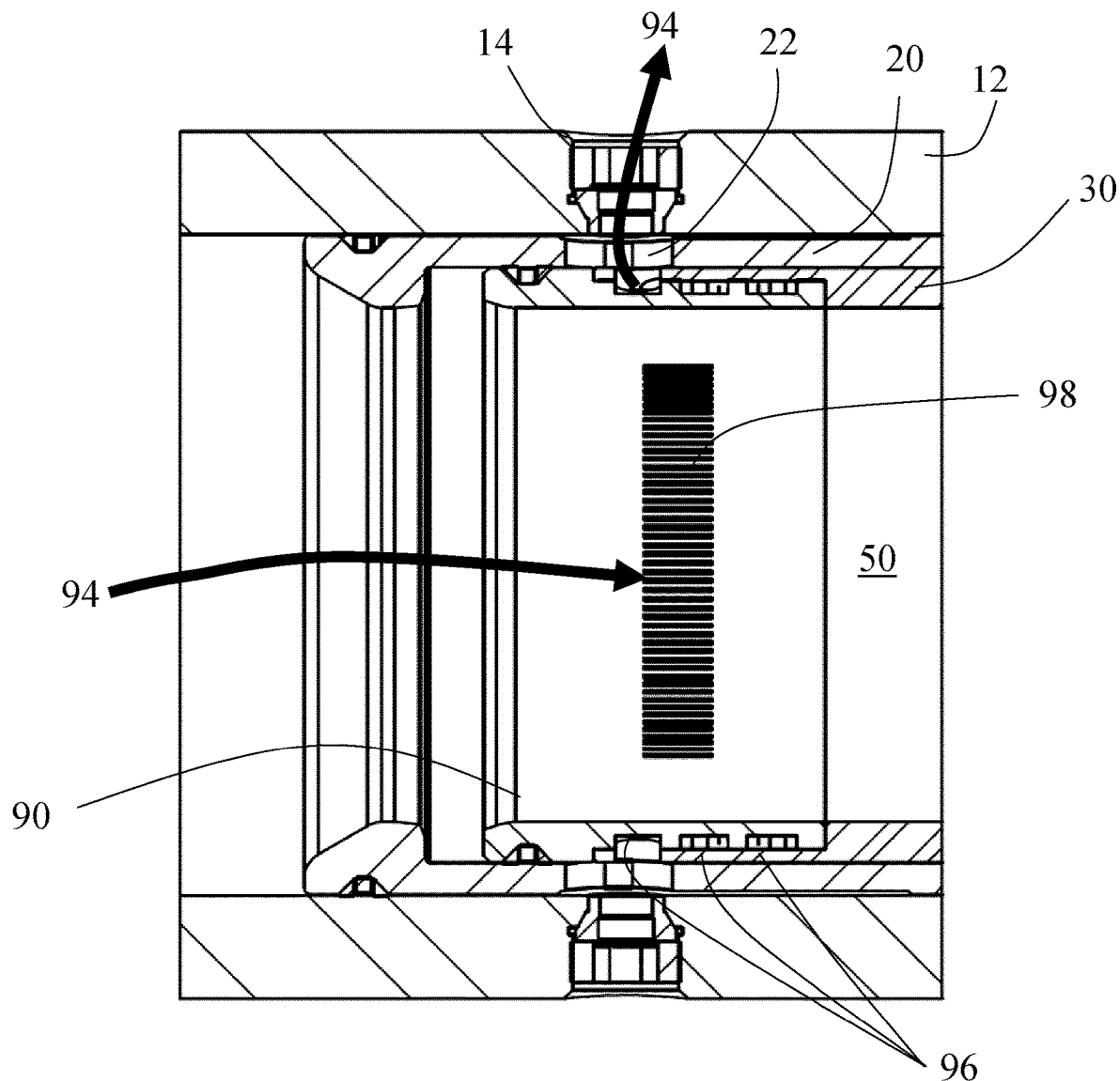
FIG. 7A is an enlarged view of area J in FIG. 8D showing the flow restriction member of the valve assembly when the inner sleeve is in the closed position.

FIG. 7A shows a flow restriction member 90 in the valve assembly with the inner sleeve in the closed position such that the flow restriction member is restricting flow through the ports 14. The flow restriction member 90 may provide a long tortuous flow path 94 between the fluid passageway 50 in the inner sleeve 30 and the outer sleeve openings 22 and ports 14 in the tubular housing 12. Restricting fluid flow through the flow path 94 may be accomplished by having slits 98 through the wall of the flow restriction member that lead to grooves 96 in the outer surface 30a of the inner sleeve wall and eventually to the outer sleeve openings 22. The slits 98 also act as a coarse filter.

The flow path 94 in FIG. 7A is shown exiting the valve assembly, but it can also be reversed such that fluid is entering the valve assembly fluid passageway 50 from outside the valve assembly.

FIGS. 7B, 7C illustrate the flow restriction member 90 on its own, showing one embodiment of the slits 98 and the grooves 96 that provide the long tortuous flow path. FIG. 7D shows an embodiment of the end of the inner sleeve 30, wherein the flow restriction member 90 can be inserted such the fluid flows through the flow restriction member 90 and out an opening 30d in the inner sleeve wall that may align at least partly with the flow path of the flow restriction member, for example with at least part of the grooves 96.

The flow restriction member 90 may be designed to slow fluid flow but not stop it completely. The flow restriction member can be used in addition to the sealing assemblies to provide a higher flow rate through the ports 14 than if the sealing assemblies were used on their own and the inner sleeve wall covered the outer sleeve openings 22, but a lower flow rate than when the ports are completely open (i.e., when the inner sleeve is in the open position and not covering outer sleeve openings 22). This intermediate flow rate provided by the flow restriction member 90 in the closed position of FIGS. 8D and 7A may be useful for certain operations in the wellbore, such as regulating flow distribution.

The flow restriction member 90 can be configured differently than described and illustrated while still serving the same purpose of slowing the flow rate through the ports in the valve assembly. Examples of suitable flow restriction members are described in U.S. Provisional Patent Application No. 63/163,364 and Canadian Patent Application No. 3,100,997, both of which are herein incorporated by reference.

Changing Configurations of the Valve Assembly

The valve assembly 10 may be moved between its various configurations using a shifting tool. The shifting tool may apply pressure to the outer sleeve 20 and/or inner sleeve 30 to shift the sleeves between positions, i.e. the first position of FIGS. 1A, 8A, 10A the second position of FIGS. 1B, 8B, 10B the open position of FIGS. 1C, 8C, 10C and the closed position of FIGS. 1D, 8D, 10C. Alternatively, the shifting tool may apply tension and/or compression to the inner and/or outer sleeves to shift them. The shifting tool may engage with the profile of the outer sleeve and/or inner sleeve to allow for shifting to occur. The shifting tool may be conveyed by wireline or by tubing. The shifting tool may be activated electrically and/or hydraulically.

Shifting tools are generally described in International PCT Patent Publication No. WO 2020/181,359 A1, which is herein incorporated by reference.

Alternatively, instead of using a shifting tool, an isolation member such as a ball or dart can be dropped into the valve assembly to allow an increase in pressure uphole of the isolation member, thereby causing the inner and outer sleeve to shift into the various positions.

The valve assembly 10 is made of one or more materials that can withstand high temperatures, for example at least 300° C., preferably or at least 350° C., more preferably at least 400° C., more preferably at least 500° C., and more preferably at least 600° C. Any seals between components of the valve assembly are preferably made of non-polymeric and non-elastomeric materials. Suitable seal materials that can withstand high temperatures include any of the following: metals, graphite, carbon composite, silicone, silica, vermiculite, fiberglass, compressed non-asbestos, ceramic fiber and calcium alumina silicate. This applies to all the valve assembly components, including the tubular housing 12, the outer sleeve 20, the inner sleeve 30, the plugs 16, the sealing assembly 60, the locking member 18, the coupling member 40, the alignment member 42, the collet member 80, and the flow restriction member 90.

The valve assembly can withstand high pressures, for example pressures of at least 5000 psi, and more preferably at least 10,000 psi.

Although various members of the valve assembly have been described as separate members or assemblies, one of more of these members or assemblies may be combined together into one member having the same functions as the separate members/assemblies. For example, the locking member 18, coupling member 40, collet member 80, alignment member 42 and/or one or more sealing assemblies 60 may be combined together.

Numerous modifications and variations of the present disclosure are possible in light of the above teachings. It is therefore to be understood that within the scope of the appended claims, the disclosure may be practiced otherwise than as specifically described herein.

The invention claimed is:

1. A valve assembly for downhole use in a high temperature well comprising:
   a tubular housing having:
      a housing wall having an inner surface and an outer surface;
      a fluid passageway defined within the tubular housing; and
      at least one port in the housing wall for allowing fluid communication between the fluid passageway and outside the tubular housing;
   a first sleeve disposed in the tubular housing and longitudinally slidable with respect to the tubular housing; and
   at least one sealing assembly for restricting fluid flow between the fluid passageway and the at least one port, comprising:
      at least one ring-shaped member in a radial groove that creates a tortuous flow path through the at least one ring-shaped member from a first side of the radial groove to a second side of the radial groove to restrict fluid flow through the at least one sealing assembly.

2. The valve assembly of claim 1, wherein the valve assembly can withstand temperatures of at least 300° C.

3. The valve assembly of claim 1, wherein the at least one sealing assembly consists of non-polymeric material.

4. The valve assembly of claim 1, wherein the high temperature well is a geothermal well.

5. The valve assembly of claim 1, wherein the at least one ring-shaped member comprises a plurality of rings.

6. The valve assembly of claim 1, wherein the at least one ring-shaped member comprises a coiled member having a plurality of rings.

7. The valve assembly of claim 5, wherein the rings are arranged side by side in the radial groove, and each ring has a body with a first side face and a second side face.

8. The valve assembly of claim 7, wherein at least one of the rings has a gap in its body for allowing fluid flow through the body between the first and second side faces.

9. The valve assembly of claim 8, wherein the gap comprises a slit through the body of the ring at an angle with respect to the radial axis of the ring.

10. The valve assembly of claim 8, wherein multiple rings comprise gaps through their bodies, and the gaps of adjacent rings are not aligned.

11. The valve assembly of claim 5, wherein there is an inter-ring gap between adjacent rings for allowing fluid flow between adjacent rings.

12. The valve assembly of claim 1, wherein the radial groove is defined by a first side wall, a second side wall, a top surface and a bottom surface; and wherein the first side wall and the second side wall are at obtuse angles with respect to the bottom surface.

13. The valve assembly of claim 1, wherein increasing longitudinal fluid pressure on the at least one sealing assembly increases flow resistance in the at least one sealing assembly.

14. The valve assembly of claim 1, wherein the at least one ring-shaped member is metal.

15. The valve assembly of claim 1, further comprising a plug disposed in the at least one port and shearable from a closed position, in which the plug maintains a fluid seal in the at least one port, to an open position, in which fluid can flow through the at least one port.

16. The valve assembly of claim 1, wherein the plug is a closed-end hollow frangible plug that consists of non-polymeric materials.

17. The valve assembly of claim 1, further comprising:
   a second sleeve disposed in the first sleeve and longitudinally slidable with respect to the first sleeve between an open position, wherein the second sleeve does not substantially restrict fluid flow through the at least one port, and a closed position, wherein the second sleeve restricts fluid flow through the at least one port; and
   a coupling member comprising an annular member having an inner surface that engages with an outer surface of the first sleeve and the second sleeve to couple the first and second sleeves together in the first position, and releases the second sleeve from the first sleeve in the second position;
   wherein the first sleeve having a wall and further comprises at least one opening in the wall, and the first sleeve is longitudinally slidable with respect to the tubular housing between a first position, wherein fluid flow between the at least one opening and the at least one port is restricted, and a second position, wherein there is a substantially open flow path between the at least one opening and the at least one port;

wherein the inner surface of the annular member comprises radial grooves that engage with corresponding radial grooves in the outer surface of the first sleeve and/or the second sleeve to couple the first and second sleeves together;

wherein the coupling member expands into a coupling recess in the tubular housing when the first and second sleeve move from the first position to the second position to release the second sleeve from the first sleeve.

18. The valve assembly of claim 1, further comprising a flow restriction member in the fluid passageway to restrict flow through the ports when the first sleeve is in the second position, wherein the flow restriction member increases the length and tortuosity of the fluid flow path to restrict flow.

19. The valve assembly of claim 18, wherein the flow restriction member comprises a sleeve having an outer wall and a plurality of slits in the wall through which the flow path goes.

20. The valve assembly of claim 18, wherein the flow restriction member comprises a sleeve having an outer wall and a tortuous groove in the outer wall through which the flow path goes.

* * * * *